US011029675B1

(12) United States Patent
Blount et al.

(10) Patent No.: US 11,029,675 B1
(45) Date of Patent: Jun. 8, 2021

(54) EXTENSIBLE INDUSTRIAL INTERNET OF THINGS PLATFORM

(71) Applicant: sensemetrics, Inc., San Diego, CA (US)

(72) Inventors: Marquis Blount, San Diego, CA (US); Justin Ferrara, San Diego, CA (US); Adam Hickey, San Diego, CA (US); Duke Nguyen, San Diego, CA (US)

(73) Assignee: sensemetrics, Inc., San Diego, CA (US)

( * ) Notice: Subject to any disclaimer, the term of this patent is extended or adjusted under 35 U.S.C. 154(b) by 0 days.

(21) Appl. No.: 17/158,844

(22) Filed: Jan. 26, 2021

Related U.S. Application Data

(60) Provisional application No. 62/966,918, filed on Jan. 28, 2020.

(51) Int. Cl.
*G05B 23/02* (2006.01)
*G16Y 40/35* (2020.01)

(52) U.S. Cl.
CPC ..... *G05B 23/0216* (2013.01); *G05B 23/0272* (2013.01); *G05B 23/0297* (2013.01); *G16Y 40/35* (2020.01)

(58) Field of Classification Search
None
See application file for complete search history.

(56) References Cited

U.S. PATENT DOCUMENTS 10,079,898 B2 9/2018 Lau et al.
10,156,841 B2 12/2018 Wu et al.
10,234,853 B2 3/2019 Mukkamala et al.
10,305,734 B2 5/2019 Dost et al.
10,567,367 B2 2/2020 Banga et al.
2016/0087933 A1* 3/2016 Johnson .................. H04L 67/34 709/245
2017/0255373 A1 9/2017 Bruno et al.
2018/0054850 A1* 2/2018 Leonelli .................. H04W 4/70

(Continued)

OTHER PUBLICATIONS

Boulis et al. SensorWare: Programming sensor networks beyond code update and querying, May 5, 2007, Pervasive and Mobile computing, vol. 3 Issue 4, pp. 386-412, URL:<https://www.sciencedirect.com/science/article/pii/S1574119207000314> (Year : 2007).*

(Continued)

*Primary Examiner* — Kenneth M Lo
*Assistant Examiner* — Jonathan Michael Skrzycki
(74) *Attorney, Agent, or Firm* — Gardella Grace P.A.

(57) ABSTRACT

In an illustrative embodiment, the present disclosure relates to systems, methods, and an industrial internet of things (IIOT) platform and environment for generating a device integration definition to be used for configuring a new device type for interoperability with the IIOT platform and environment, where the device integration definition includes a standardized format in a programming language syntax, the device integration definition is customizable using code hook templates for issuing commands to the device type, and the device integration definition is customizable using control templates for applying the device integration definition as a foundation for preparing a graphical user interface for configuring devices of the device type with the IIOT platform and environment.

19 Claims, 23 Drawing Sheets

(56) References Cited

U.S. PATENT DOCUMENTS

| | | | | |
|---|---|---|---|---|
| 2018/0139090 | A1 | 5/2018 | Geiger et al. | |
| 2019/0361411 | A1* | 11/2019 | Park | G06F 16/288 |
| 2019/0361412 | A1* | 11/2019 | Park | G06N 5/043 |
| 2020/0103894 | A1* | 4/2020 | Celia | H04B 17/309 |
| 2020/0225655 | A1* | 7/2020 | Cella | G06N 3/0472 |
| 2020/0358656 | A1 | 11/2020 | Klein et al. | |

OTHER PUBLICATIONS

Sugihara et al. Programming Models for Sensor Networks: A survey, Mar. 2008, ACM Transactions on Sensor Networks, vol. 4 No. 2, Article 8, URL:<https://dl.acm.org/doi/pdf/10.1145/1340771.1340774> (Year: 2008).*

Escapa, Samuel, AWS IoT: Creating your first cloud-bound device, Feb. 9, 2018, Retrieved from the Internet URL:<https://medium.com/tensoriot/aws-iot-creating-your-first-cloud-bound-device-d8dca0695f43> (Year: 2018).*

Liu et al, Tutorial—Define a new device type in your Azure IoT Central Application, Oct. 29, 2018, Retrieved from the Internet URL:<https://web.archive.org/web/20190108103953/https://docs.microsoft.com/en-us/azure/iot-central/tutorial-define-device-type> (Year: 2018).*

Sensemetrics Inc., Device Configuration Overview, SenseMetrics support documents from archive.org, 2017, URL:<https://web.archive.org/web/20170623205333/http://support.sensemetrics.com/hc/en-us/articles/204912609-Device-Configuration-Overview> (Year: 2017).*

Sensemetrics Inc., sensemetrics Launches Thread X3 Broadband Sensor Connectivity Device to Bring Secure, Cloud-Managed IIoT to Distributed Environments, Jan. 12, 2021, Globe Newswire, San Diego. https://www.globenewswire.com/news-release/2021/01/12/2156988/0/en/sensemetrics-Launches-Thread-X3-Broadband-Sensor-Connectivity-Device-to-Bring-Secure-Cloud-Managed-IIoT-to-Distributed-Environments.html.

Sensemetrics Inc., sensemetrics Joins Forces with Ackcio to Advance IIoT-Driven Automated Data Management and Analytics in Industrial Monitoring, Oct. 6, 2020, Globe Newswire, San Diego. https://www.globenewswire.com/news-release/2020/10/06/2104290/0/en/sensemetrics-Joins-Forces-with-Ackcio-to-Advance-IIoT-Driven-Automated-Data-Management-and-Analytics-in-Industrial-Monitoring.html.

Sensemetrics Inc., sensemetrics Launches Tailored IIoT Solution to Mitigate Risk in the Design, Construction and Operation of Min Tailings Storage Facilities, Aug. 26, 2020, Globe Newswire, San Diego. https://www.globenewswire.com/news-release/2020/08/26/2083970/0/en/sensemetrics-Launches-Tailored-IIoT-Solution-to-Mitigate-Risk-in-the-Design-Construction-and-Operation-of-Mine-Tailings-Storage-Facilities.html.

Sensemetrics Inc., Connectivity, The Thread: Next-Generation Sensor Connectivity, Thread Data Sheet from Oct. 2019.

* cited by examiner

| Connectivity | Data | Spatial | Alerts | Reports | Integrations | Admin | | |
|---|---|---|---|---|---|---|---|---|
| Devices | Sensors | Nodes | Algorithms | Categories | | | | |

| | ID | Name | Metrics | Units |
|---|---|---|---|---|
| + Add Sensor Integration | | | | |
| x | EXTENSOMETER_VW_GEOKON_SDE | Geokon Extensometer | [f, T] | [Hz, C] |
| x | EXTENSOMETER_VW_GEOSENSE_VW | Geosense Displacement Gauge 5000 | [f, T] | [Hz, C] |
| x | FLOW_CUMULATIVE_SDE | Cumulative Flow | [volume] | [L] |
| x | FLOW_RATE_VOLUME_SDE | Volumetric Flow Rate | [v_flow_volume] | [lps] |
| x | FLOW_SDE | Flow | [v_flow, v_flow_volume] | [mps, cmps] |
| x | FOUR_TO_TWENTY_AMPS_MULTI_PU | Multipurpose 4-20mA Sensor | [I] | [mA] |
| x | FREE_MEMORY_SDE | Free Memory | [data_memory] | [B] |
| x | FREQUENCY_SDE | Frequency | [f] | [Hz] |
| x | FULL_WHEATSTONE_BRIDGE_SDE | Full Wheatstone Bridge | [V] | [mV] |
| x | GEOSENSE_VWP_3000_SDE | Geosense VWP 3000 | [f, T] | [Hz, C] |
| x | GEOSENSE_VWS_2100 | Geosense Embedment Strain Gauge | [f, T] | [Hz, C] |
| x | GEOSENSE_VWT_9000 | Geosense VW Pressure Transducer | [f, T] | [Hz, C] |
| x | HUMIDITY_SDE | Humidity | [RH] | [UNITLESS] |
| x | IN-SITU AQUATROLL 500 PRESSURE | In-Situ AquaTROLL 500 Pressure | [P] | [psi] |

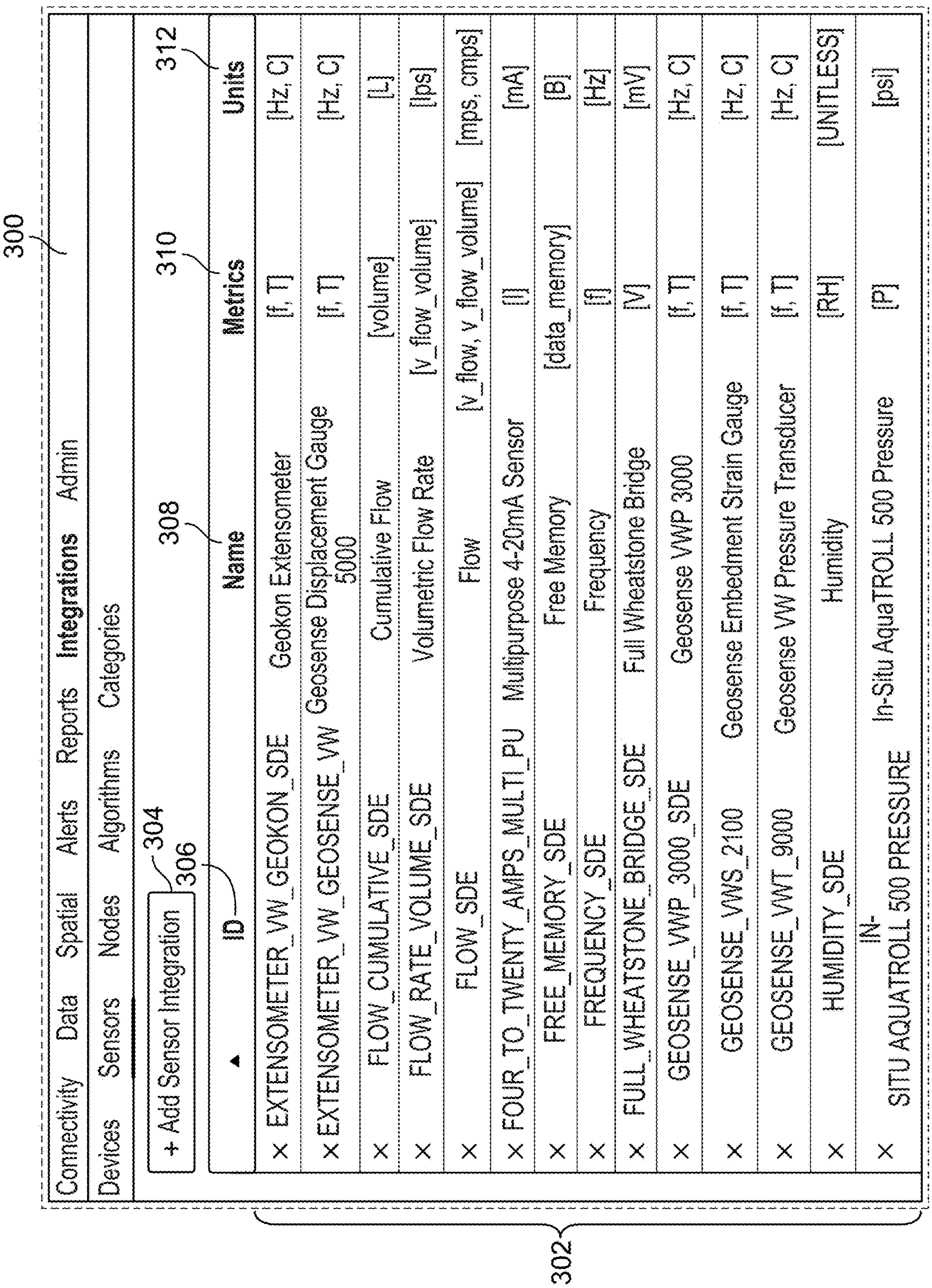

FIG. 3A

Connectivity Data Spatial Alerts Reports Integrations Admin
Devices Sensors Nodes Algorithms Categories

320

Add sensor integration

ID
| GEOKON_PIEZO  322 |

Name
| Geokon Piezometer  324 |

Metrics
| f,T  326 |

Units
| Hz,C  328 |

[Sumbit]

| Connectivity | Data | Spatial | Alerts | Reports | **Integrations** | Admin |
|---|---|---|---|---|---|---|
| Devices | **Sensors** | Nodes | Algorithms | Categories | | |

340

348

```yaml
Edit Yaml   Hide Yaml
☒  1  id: GEOKON_PIEZO
   2  name: Geokon Piezometer
   3  metrics:
   4   - f
   5   - T
   6  units:
   7   - Hz
   8   - C
   9  controls: |
▸ 10   - id: textInput
   11    modelPath: props.MUX_INDEX
   12    layout: first-column
▸ 13    config:
   14      label: Index
   15    restrictions:
   16      disabled: true
▸ 17   - id: geokonCalibrationFactors
   18    modelPath: props.CALIBRATION_VALUES
   19    layout: first_column
▸ 20    config:
```

344

346

☐ Control Templates — 348C
- controls-array
- thread-device
- textInput
- textarea
- passwordInput
- numberInputWithUnit — 348i
- formSelect
- frequencySelect
- formTimePicker
- imagePreview
- locationInput
- multiplexerChannelConfig
- referenceSensorConfig — 348m
- zeroReferenceConfig — 348n

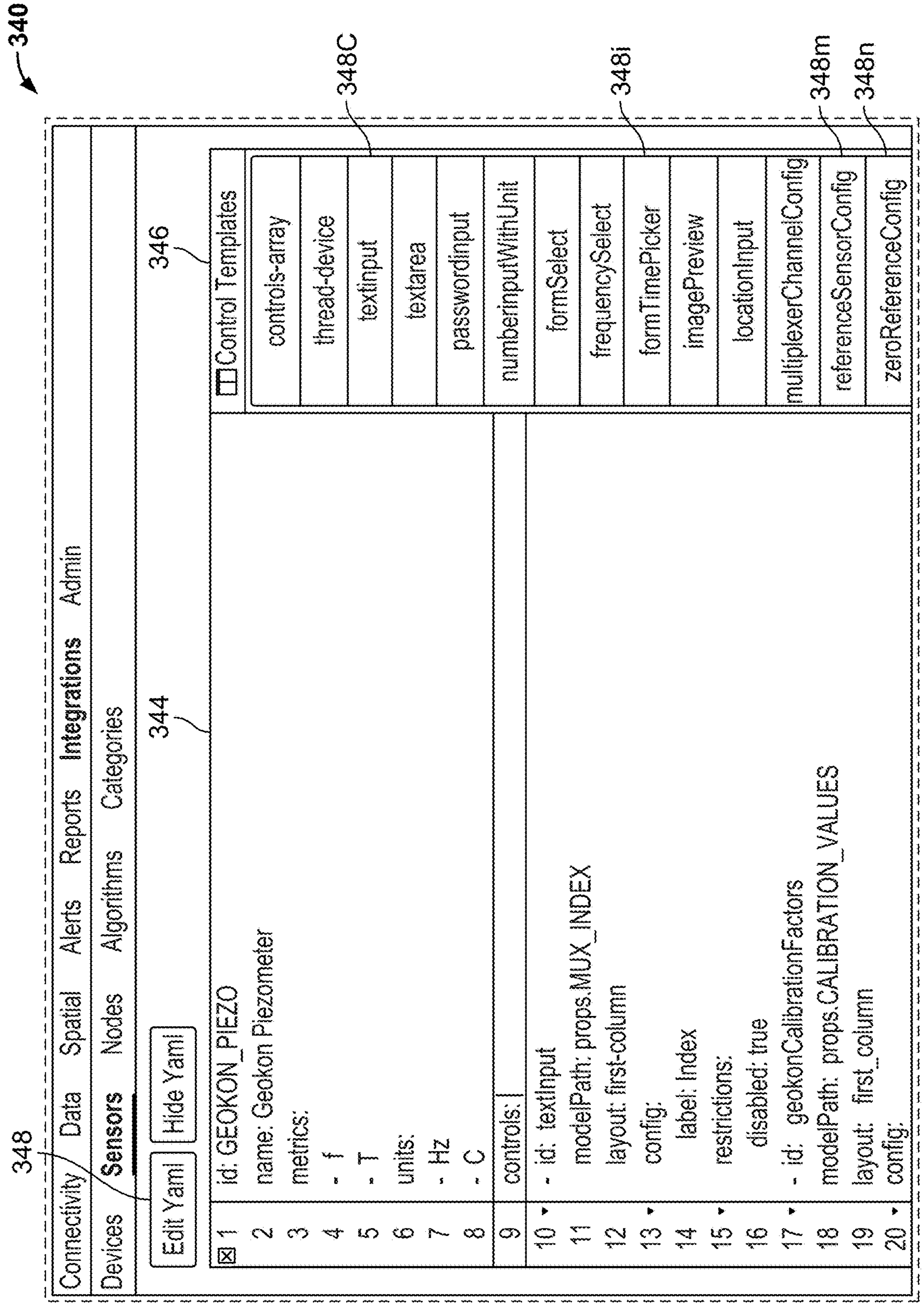

FIG. 3C

```
 21    label: Calibration Factors (kPa)
 22    keys:
 23     - A
 24     - B
 25     - K
 26  ▸ - id: zeroReferenceConfig
 27    modelPath: props
 28    layout: first-column
 29  ▸ config:
 30  ▸ help:
 31      text:  Learn more about configuring vibrating wires
 32      link:  https://support.sensemetrics.com/hc/en-us/articles/208463396-
 33    label: Configuration Settings
 34    keys:
 35     - R0
 36     - T0
 37     - S0
 38    placeholders:
 39     - R0 (digits)
 40     - T0 (°C)
 41     - S0 (mbar)
 42  ▸ - id: formTimePicker
 43    modelPath: props.ZERO_DATE
 44    layout: first-column
 45  ▸ config:
 46    label: Reference Date
 47  ▸ - id: referenceSensorConfig
 48    modelPath: props
 49    layout: first-column
 50  ▸ config:
 Subm▶
```

344

- culvertConfig
- miliampRangeConfig
- ipiArrayConfig
- temperatureArrayConfig — 348t
- action
- calibrationFactors — 348u
- geokonCalibrationFactors
- rstCalibrationFactors — 348v
- restrictions-disabled
- spatial-fields
- vibrating-wire

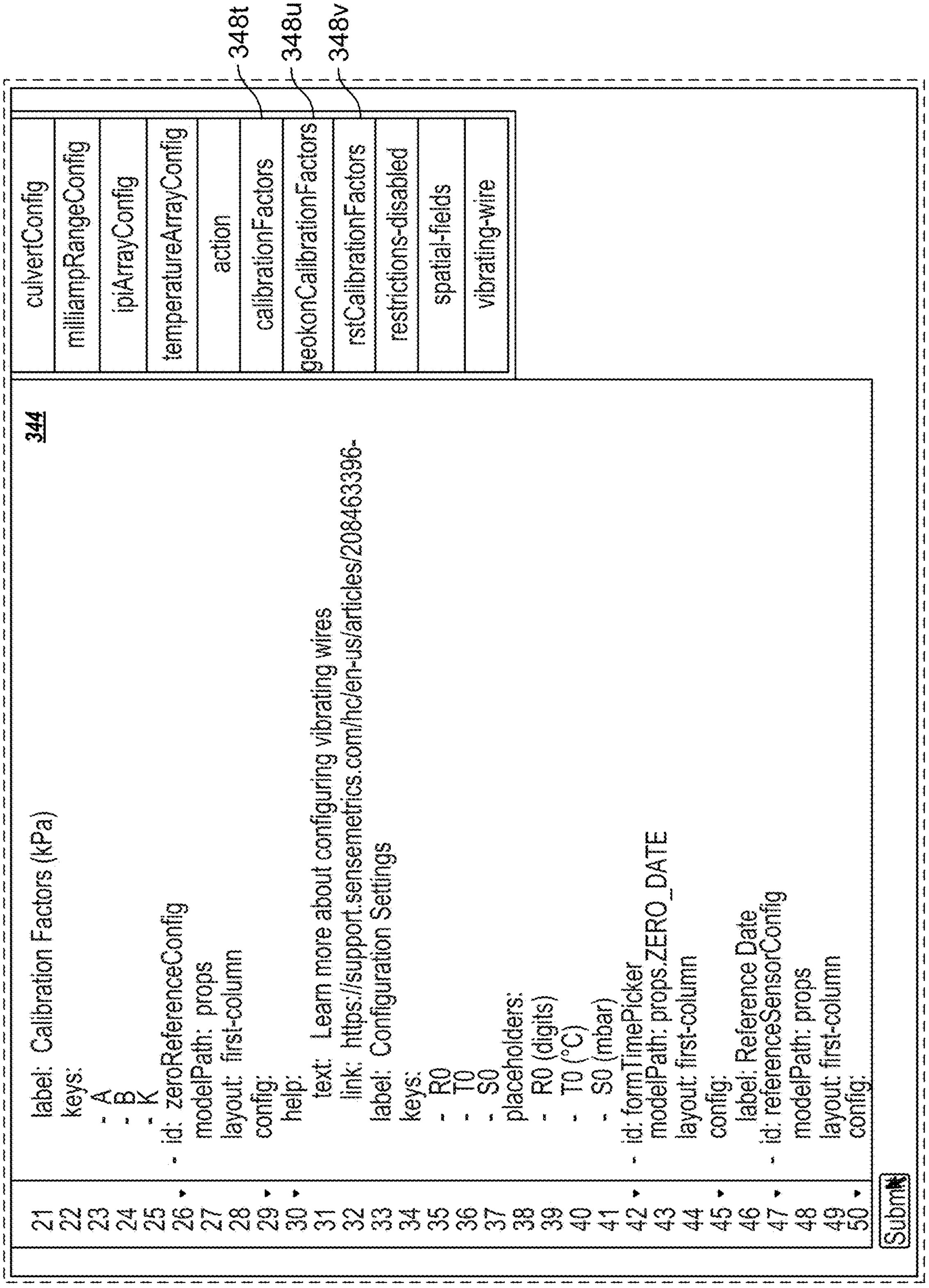

FIG. 3D

Connectivity Data Spatial Alerts Reports Integrations Admin

Devices Sensors Nodes Algorithms Categories

Add device integration

ID: GEOKON_LC2_SINGLE — 412a

Name: Geokon LC-2 Single — 412b

Manufacturer: Geokon — 412c

Interface Type: RS232 — 414a

Baud Rate: 9600 — 414b

Delimiter: CR — 414c

Scripting Language: Python — 416

Sensors Select the associated sensors and their mount type for this device integration — 419

| | ID — 418 | Mount Type |
|---|---|---|
| ☐ | FREQUENCY_SDE | fixed |
| ☐ | FULL_WHEATSTONE_BRIDGE_SDE | fixed |
| ☑ | **GEOKON_PIEZO** | fixed |
| ☐ | GEOSENSE_VWP_3000_SDE | fixed |
| ☐ | GEOSENSE_VWS_2100 | fixed |
| ☐ | GEOSENSE_VWT_9000 | fixed |

417

Submit

410

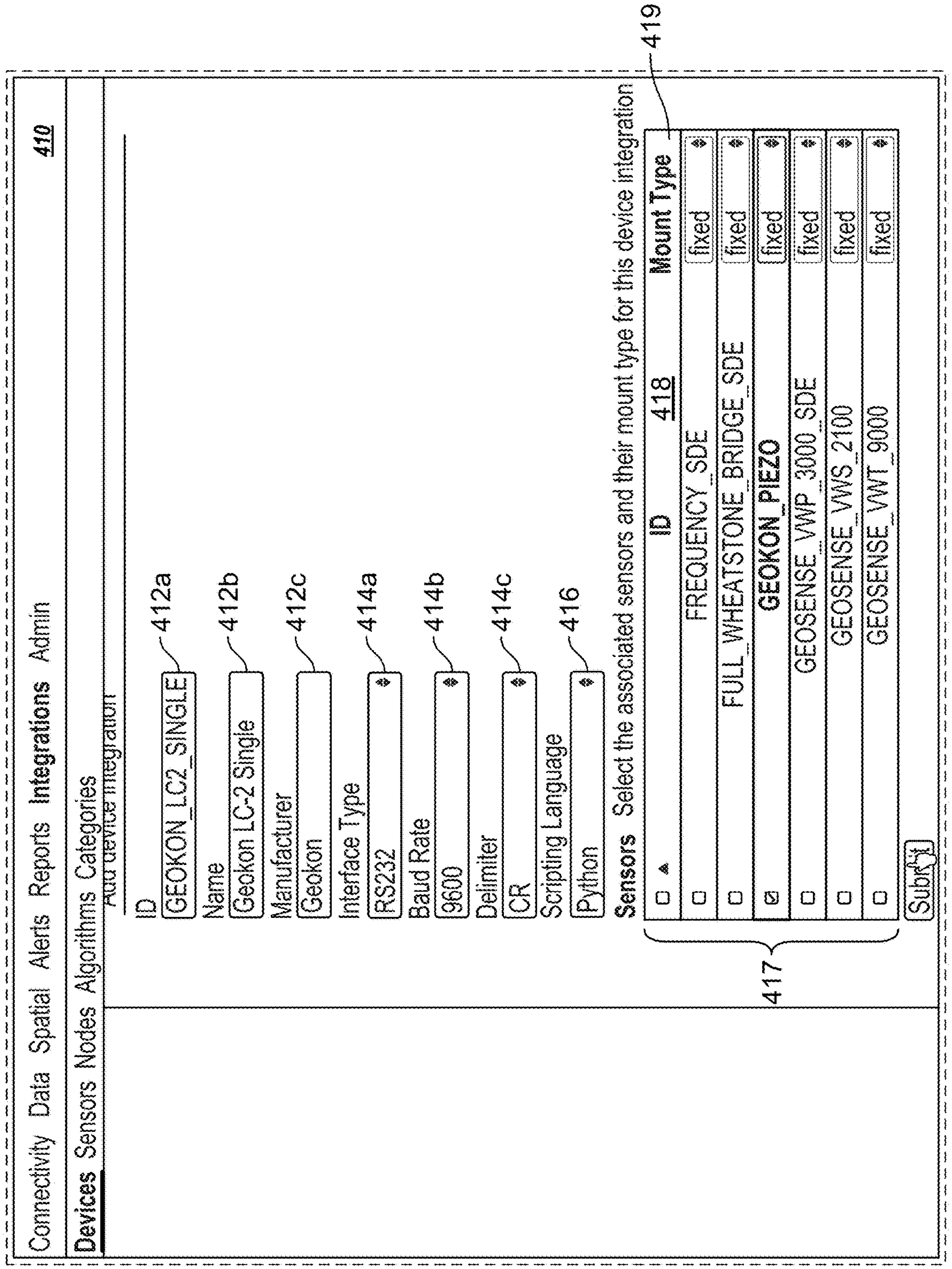

FIG. 4B

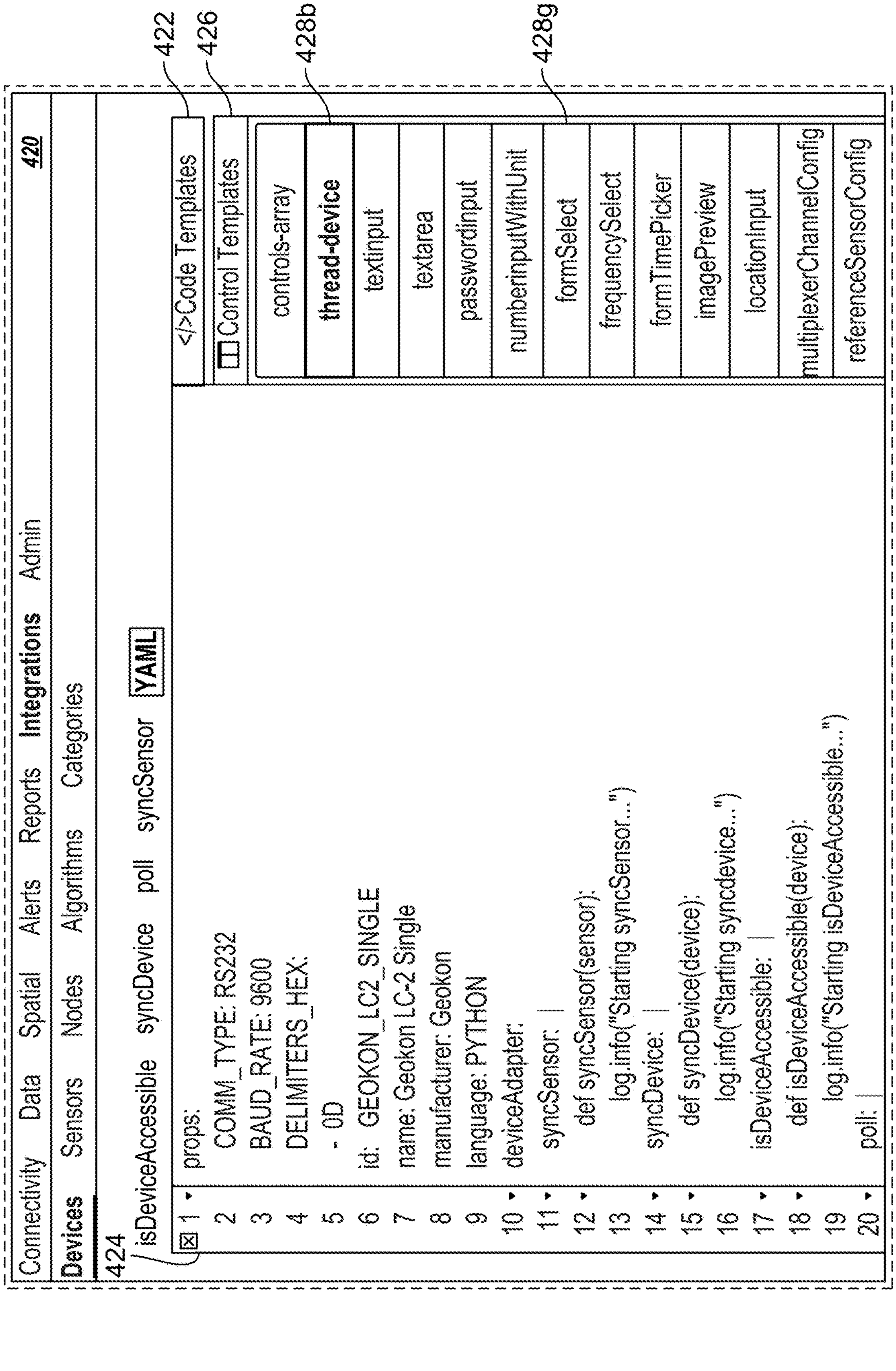

FIG. 4C

```yaml
props:
  COMM_TYPE: RS232
  BAUD_RATE: 9600
  DELIMITERS_HEX:
    - 0D
  id: GEOKON_LC2_SINGLE
  name: Geokon LC-2 Single
  manufacturer: Geokon
  language: PYTHON
  deviceAdapter:
    syncSensor:
      def syncSensor(sensor):
        log.info("Starting syncSensor...")
    syncDevice:
      def syncDevice(device):
        log.info("Starting syncdevice...")
    isDeviceAccessible:
      def isDeviceAccessible(device):
        log.info("Starting isDeviceAccessible...")
    poll:
```

Tabs: Connectivity | Data | Spatial | Alerts | Reports | Integrations | Admin
Sub-tabs: Devices | Sensors | Nodes | Algorithms | Categories
Inner tabs: isDeviceAccessible | syncDevice | syncSensor | poll | syncSensor [YAML]

Code Templates
☐ Control Templates
- controls-array
- thread-device
- textinput
- textarea
- passwordinput
- numberinputWithUnit
- formSelect
- frequencySelect
- formTimePicker
- imagePreview
- locationInput
- multiplexerChannelConfig
- referenceSensorConfig 420, 422, 424, 426, 428b, 428g

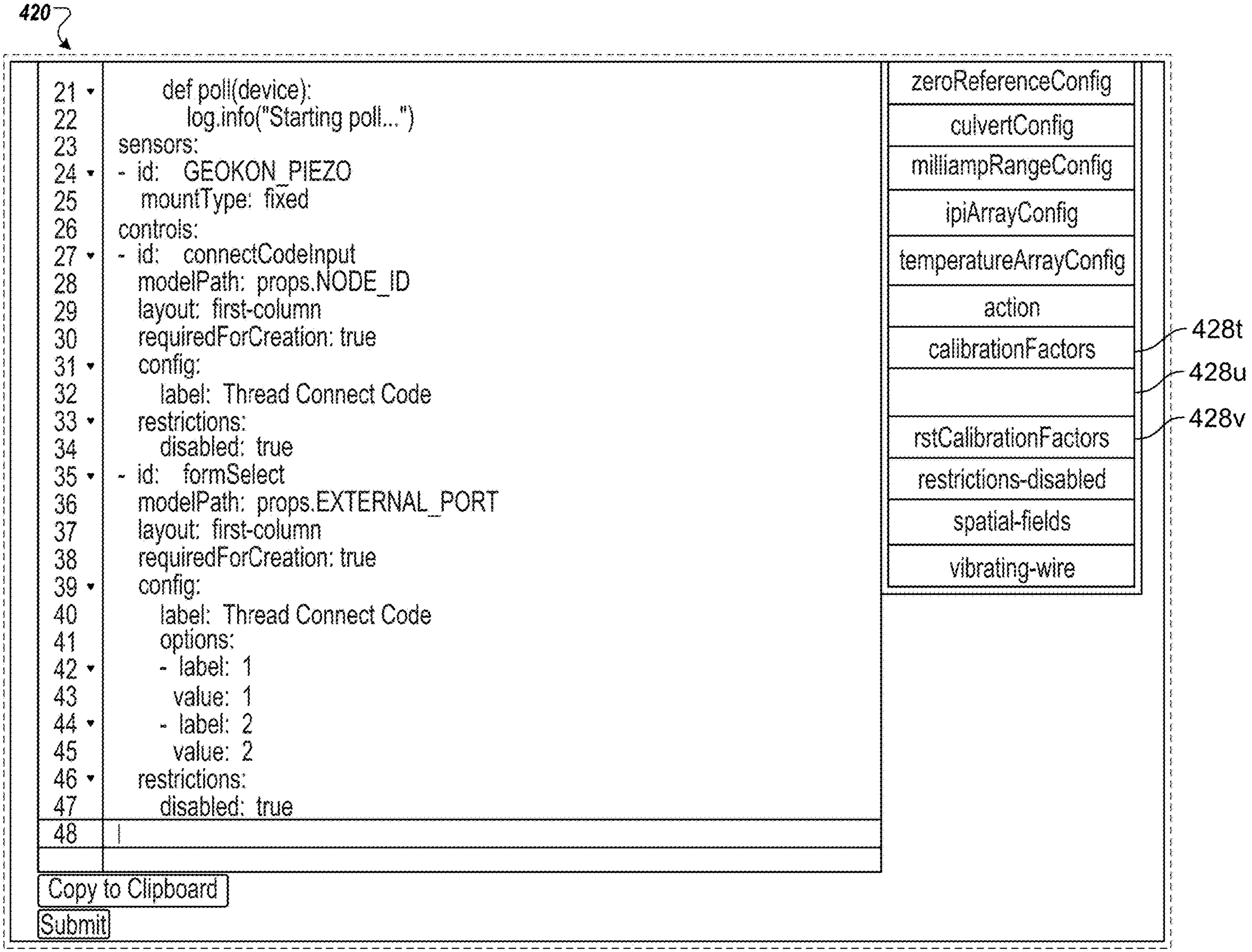

FIG. 4D

```
                                                   ┌─ 428t
                                                   │ ┌─ 428u
                                                   │ │ ┌─ 428v
        ┌──────────────────────────┐
        │ zeroReferenceConfig      │
        │ culvertConfig            │
        │ milliampRangeConfig      │
        │ ipiArrayConfig           │
        │ temperatureArrayConfig   │
        │ action                   │
        │ calibrationFactors       │
        │ rstCalibrationFactors    │
        │ restrictions-disabled    │
        │ spatial-fields           │
        │ vibrating-wire           │
        └──────────────────────────┘

420
 21 ▸   def poll(device):
 22 ▸       log.info("Starting poll...")
 23   sensors:
 24 ▸  - id:  GEOKON_PIEZO
 25      mountType: fixed
 26     controls:
 27 ▸    - id:  connectCodeInput
 28        modelPath: props.NODE_ID
 29        layout: first-column
 30        requiredForCreation: true
 31 ▸      config:
 32          label: Thread Connect Code
 33 ▸      restrictions:
 34          disabled: true
 35 ▸    - id:  formSelect
 36        modelPath: props.EXTERNAL_PORT
 37        layout: first-column
 38        requiredForCreation: true
 39 ▸      config:
 40          label: Thread Connect Code
 41 ▸        options:
 42          - label: 1
 43            value: 1
 44          - label: 2
 45            value: 2
 46 ▸      restrictions:
 47          disabled: true
 48

[Copy to Clipboard]
[Submit]
```

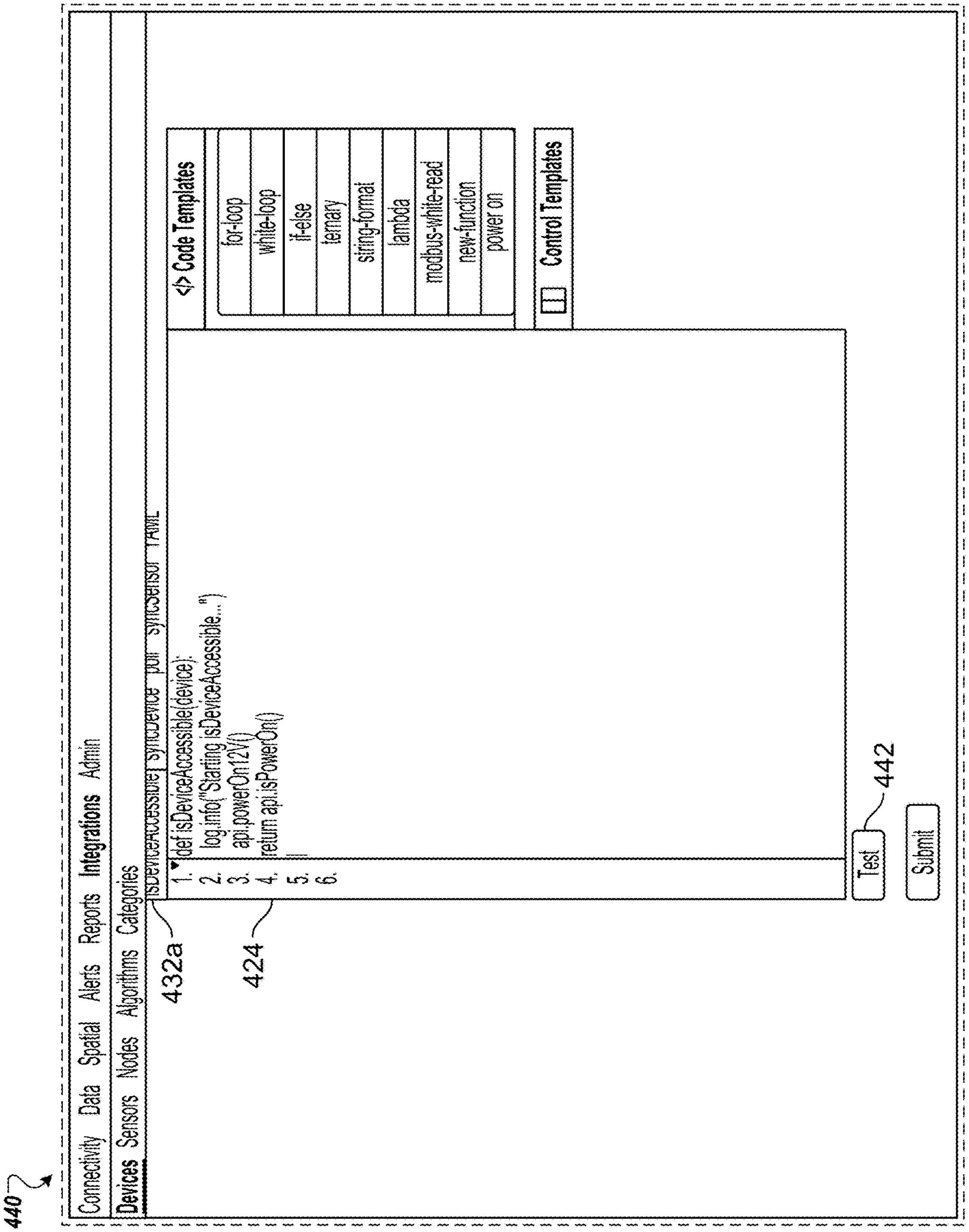

FIG. 4F

Connectivity Data Spatial Alerts Reports Integrations Admin
Devices Sensors Nodes Algorithms Categories isDeviceAccessible| syncDevice_pull syncSensor_pull

```
1. def isDeviceAccessible(device):
2.    log.info("Starting isDeviceAccessible...")
3.    api.powerOn12V()
4.    return api.isPowerOn()
5.
6.
```

432a
424

</> Code Templates
- for-loop
- while-loop
- if-else
- ternary
- string-format
- lambda
- modbus-white-read
- new-function
- power on ☐ Control Templates

[Test] — 442
[Submit]

440

EXTENSIBLE INDUSTRIAL INTERNET OF THINGS PLATFORM

RELATED APPLICATIONS

This application claims priority to U.S. Provisional Patent Application Ser. No. 62/966,918, entitled "Extensible Industrial Internet of Things Platform," filed Jan. 28, 2020. All above identified applications are hereby incorporated by reference in their entireties.

BACKGROUND

Industrial sensors and sensor devices are used for monitoring environmental phenomenon as well as manufacturing, construction, and utilities related activities. The sensors, in some examples, can provide useful information and/or warnings to customers in mining and agriculture industries. The output of industrial sensors and sensor devices can provide early warning regarding problems with forestry and water systems, roads and railways, bridges and tunnels, and resource distribution pipelines. In some examples, the industrial sensors and sensor devices can include temperature sensing, position sensing, pressure sensing, flow sensing, and/or load sensing. The multitude of sensor types and sensor outputs can be managed within an industrial internet of things (IIOT) sensor network to monitor readings and provide valuable insight into the systems being monitored.

Setting up or updating an IIOT sensor network involves providing information regarding the deployment, including sensor device models and serial numbers, connections to network aggregators, and desired formatting of resultant metrics, to a cloud-based IIOT platform environment for configuration. Internal employees of the IIOT platform would then establish the code required to enable communications between the local IIOT sensor network and the IIOT platform environment. This process is slow and difficult to test on the side of the IIOT platform.

For software upgrades of the IIOT platform environment and IIOT sensor network, the code desired (e.g., new sensor models, additional capabilities, etc.) needs to be added internally by employees of the IIOT platform, built, tested, and released for deployment. This cycle commonly takes weeks to accomplish and requires a server re-start to enable connectivity of the deployment. The server re-start leads to a period of down-time for all devices connected to the IIOT platform environment.

The inventors recognized a need for integration of new devices and sensors that can be accomplished in near real-time without disturbing active deployments. The inventors wished to avoid restarting sensor devices and/or recompiling cloud computing code. The inventors desired a solution that allows for backwards-compatibility with existing legacy device and sensor integrations with the IIOT platform and co-exists with other extensibility solutions. Further, the inventors desired a straightforward and simple method for importing and exporting device/sensor integration definitions between different IIOT platform environments (e.g., from geographic region to geographic region, customer to customer, etc.). Further, the inventors desired a solution that enforces sandboxing between customer deployments to maintain independence between deployments while also enforcing security mechanisms on upgrades to not destabilize any customer deployment.

SUMMARY OF ILLUSTRATIVE EMBODIMENTS

The inventors developed novel and innovative integration methods and systems for adding, adjusting, and updating sensors and sensor devices within a live IIOT platform environment. The integration methods and systems, in some embodiments, include a generic variable structure for defining new device and sensor integrations in the IIOT platform environment. The generic variable structure, for example, may uniquely recognize devices through a combination of a device type and one or more of a device ID and a serial number. Each device or sensor may be set up with a particular deployment location (e.g., latitude/longitude/elevation), data sampling interval, and/or device name. Further, each device or sensor may be set up with a particular network connection. The network connection may be managed through an IIOT platform aggregator designed to enable network communication between the device or sensor and the IIOT platform.

In some embodiments, the integration methods and systems include a software design kit (SDK) or web-based user interface for creating and modifying integration definitions. The integration definitions, for example, may be generated at least in part through a number of graphical user interface control templates 164, such as drop-down boxes, text entry fields, and selection toggles designed to receive information relevant to different variables of the generic variable structure. In another example, at least a portion of the integration definitions may be generated through creating code hooks programmed in runtime interpretable code, such as Python or Java, for controlling the sensor or sensor device and for querying information therefrom. The code hooks, in some implementations, are presented to the user as code hook templates 164, such as generic code stubs for customizing communications between the sensor or sensor device and the IIOT platform environment. The integration definitions, in other implementations, may be built at least in part using drag and drop visual coding constructs. While being more restrictive, the visual coding constructs can assist external device manufacturers and customers in developing functional integration definitions.

In other embodiments, the integration methods and systems include a hot pluggable runtime or open-source model. For example, the runtime-interpretable code may be developed in a modular software framework, such as OSGi, that supports configuration of runtime-interpretable code. In another example, the runtime-interpretable code may be pushed to the IIOT platform environment from an external code repository. In a particular illustration, a GitHub pull request access may be used to push device and sensor integrations to the IIOT platform environment. While highly customizable, this arrangement may pose a barrier to entry for some external users due to the level of sophistication in coding required to produce the integration.

In some embodiments, the integration definitions are uploaded to the IIOT platform environment through an application programming interface (API) connection. For example, generic integration definitions designed to add a new type of sensor or sensor device to the IIOT platform may be created once and deployed many times through upload to the IIOT platform environment. The generic integration definition may include default values added to portions of the integration definition that a user can override through a graphical user interface for device setup. The device setup, for example, may include a number of controls built into the integration definition for the user to select for adjusting the default settings, such as the data sampling interval. Other controls may include user required information, such as a serial number of the customer's particular sensor or device.

The integration definitions, in some embodiments, may be downloaded to the IIOT platform aggregator as runtime-interpreted code. Each integration definition, for example, may be saved in Java or Python code formatting for interpretation at the IIOT platform aggregator. The IIOT platform aggregator, for example, may be designed to accept the runtime-interpreted code and execute the code to communicate and configure the sensor or device.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings:

FIGS. 3A-3D illustrate example screen shots of user interfaces for creating a new sensor integration definition;

FIGS. 4A-4G illustrate example screen shots of user interfaces for creating a new device integration definition;

DETAILED DESCRIPTION OF ILLUSTRATIVE EMBODIMENTS

Figure 1:
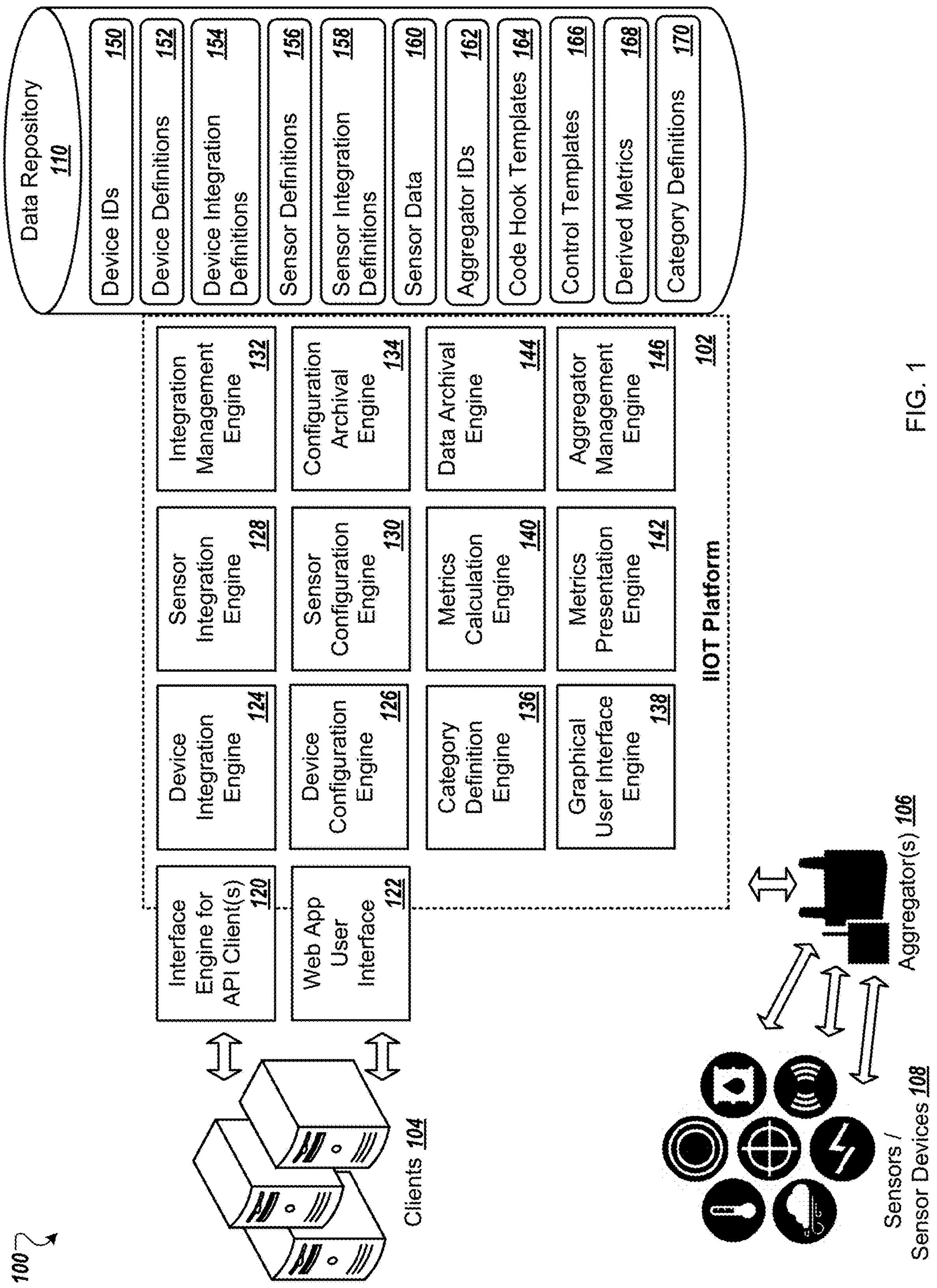
FIG. 1 is an example architecture for near real-time adding, adjusting, and updating sensors and sensor devices within a live IIOT platform environment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 is an example architecture 100 for near real-time adding, adjusting, and updating sensors and sensor devices within a live IIOT platform 102 environment. In the architecture 100, clients 104, such as IIOT platform employees, sensor device manufacturers, and IIOT deployment information technology (IT) managers connect to the IIOT platform 102 to configure and manage deployments of sensors and/or sensor devices 108. The sensors and/or sensor devices 108 communicate with the IIOT platform 102 via one or more network aggregators 106.

In operation, in some embodiments, a given client 104 may communicate with the IIOT platform 102 via an application programming interface (API) 120 or a web application user interface 122 to configure and manage the sensors and/or sensor devices 108. The web application user interface 122, for example, may provide a more guided configuration set up user interface, while the API 120 may accept formatted files compatible with the IIOT platform 102 without support of an interactive user interface. For example, the web application user interface 122 may present the user with a series of user interfaces for configuring sensors and/or sensor devices 108 via a graphical user interface engine 138.

In some implementations, the web app user interface 122 coordinates with a device configuration engine 126 to configure the sensors and/or sensor devices 108. The device configuration engine 126, in some embodiments, customizes graphical user interface prompts for the client 104 to assist the client 104 in configuring the sensors and/or sensor devices 108 for use in the IIOT platform 102 environment by presenting options appropriate to the type, model, and/or manufacturer of the sensor or device 108 the client 104 is connecting to the IIOT platform 102. The device configuration engine 126 may collect, from the client 104, a device type and/or device manufacturer and narrow selections down based on the type or manufacturer. For a given device type from a given device manufacturer, for example, the device may use a certain communication interface type and include one or more sensor types(s). To add a unique sensor or device 108, for example, the device configuration engine 126, through the web app user interface 122, may collect information including location information identifying the location of the device in deployment, one or more device identifier(s) 150 (e.g., unique identifiers and/or manufacturer provided serial numbers), and/or a device name. The device configuration engine 126 may add the collected device information to a device definition 152. Further, the device configuration engine 126 may accept identification of an aggregator identifier (ID) 158 uniquely identifying one of the aggregators 106 to which the device 108 is connection as well as, in some examples, a connection port connecting the sensor or device 108 to the aggregator 106. The device configuration may be stored by a configuration archival engine 134 to a data repository 110 as a device definition 152. Further, the device configuration may be provided to the device 108 via the connected aggregator 106. For example, an aggregator management engine 146 may send the device definition 152 to the device 108 via the aggregator 106.

Each device 108 may include one or more sensors. The device configuration engine 126, in some implementations, coordinates with a sensor configuration engine 130 to configure sensors included in each of the devices. The sensor configuration engine 130 may collect metric types output by each sensor such as, in some examples, a temperature, a humidity level, one or more angles of orientation, a load, a pressure, a flow rate, a voltage, a current, and/or a luminosity. For at least some metric types, the sensor configuration engine 130 may further associate units with each metric (e.g., degrees Celsius, Fahrenheit, or Kelvin for temperature measurements, etc.). The configuration archival engine 134 may store the sensor configuration as a sensor definition 156. The sensor definition 156 may form part of the device definition 152. For example, the sensor definition 156 may be included in the device definition 152 provided by the aggregator management engine 146 to the device 108.

In some embodiments, the device configuration engine 126 coordinates with a device integration engine 124 to integrate a new type, model, and/or manufacturer of device into the IIOT Platform 102. For example, the device configuration engine 126 may accept a unique device identifier (ID) 150, device name, device manufacturer, sensor types/metrics, and/or communication interface type(s) and generate a device integration definition 154. In one example, the client 104 creating the device integration may be a device manufacturer, and the unique device ID and/or device name may identify the device in a manner that would be recognizable to owners of the device. The communication interface type(s), in some examples, may include a serial connector such as an RS232 interface or a RS485 interface, a USB connector, a wireless interface such as a Bluetooth transmitter or RF transmitter, and/or a baud rate (e.g., 1200, 4800, 9600, 19200, 38400, 57600, 115200, 230400, etc.). The device configuration engine 126 may add the collected device information to a device integration definition 154. The device configuration engine 126 may further add one or more sensors to each device integration. Each sensor 108 may be identified using a sensor name and/or identification indicating a type of sensor. The sensor, in a particular example, may be identified using a manufacturer name and sensor type. As discussed above, each sensor may further be defined using metric type(s) output by the sensor. The sensor integration may be stored as a sensor integration definition 158. The sensor integration definition 158 may form part of the device integration definition 154.

In some implementations, the device integration engine 124 and/or sensor integration engine 128 accepts default settings for one or more features of the sensor or device 108 as part of the corresponding integration definition 154, 158. The default features, in some examples, can include a default sampling rate for obtaining data from the sensor or device 108 or a default communication method (e.g., baud rate) for communicating with the sensor or device 108.

The device integration engine 124 and/or sensor integration engine 128, in some implementations, accepts the identification of elements for assisting in setup of individual sensors and/or devices 108 (e.g., via the sensor configuration engine 130 and/or the device configuration engine 126). The elements may include icons or other metadata identifying the manufacturer, specifications, and/or options available on the particular device or sensor model. In another example, the elements may include configurations for various user interface controls for configuring the device or sensor model. The user interface controls, in some examples, may include drop-down menus, radio button selections, text entry fields, and other constructs for gathering customized information regarding a new sensor or device 108 of that model. In a particular illustration, the user interface controls may present to the user the choice of a limited number of communications methods (e.g., baud rates) provided by the sensor or device 108 of that model.

In some implementations, the device integration engine 124 and/or sensor integration engine 128 provides one or more mechanisms for accepting formulas and/or algorithms for generating derived metrics 168 from sensor readings supplied by sensors or devices 108 of the newly integrated model. The derived metrics 168, for example, may be calculated by a metrics calculation engine 140 of the IIOT platform 102 from sensor data 160 collected by sensors and/or devices 108. In some examples, derived metrics 168 can include a velocity calculated given positions and timestamps. In another example, the derived metrics 168 may include an algorithm for calculating pressure of a vibrating wire through frequency measurements and calibration factors associated with the model of sensor or device 108. Many other derived metrics 168 are possible. Each derived metric 168 may additionally be available in one or more unit measurements (e.g., temperature in Fahrenheit, Celsius, or Kelvin, etc.).

The device integration engine 124 and/or the sensor integration engine 128, in some implementations, accept customization in the form of one or more code hooks 164.

The code hooks may represent software language templates customizable to particular sensors and/or devices 108 to aid in communicating with the sensor and/or device 108. In some examples, code hooks 164 may be designed to ping a sensor or device 108 to confirm it is reachable, obtain sensor readings from a sensor or device 108, synchronize the sensor or device with the IIOT platform 102, and/or reboot a sensor or device 108. Each code hook, for example, may be presented to an end user in the form of user-editable Python, Java, Perl, or JSON syntax template, pseudocode, or code snippet. In another example, code hooks 164 may be visually coded by selecting a code hook designed to represent a particular communication with the sensor or device and using selection controls such as text boxes, drop down menus, or radio buttons to format the software code to the end user's requirements. The code hooks 164 may form part of the device integration definition 154 and/or the sensor integration definition 158. The code hooks 164 may be provided to the aggregators 106 via the aggregator management engine 146 to enable communication with the sensors and/or sensor devices 108.

In some implementations, the device integration engine 124 and/or sensor integration engine 128 stores the device integration definition 154 and/or the sensor integration definition 158 in the data repository 110 for later use. The stored integration definitions 154, 158 may be available for access by any client 104 or for a limited audience. For example, a limited release may be provided after creation of a new integration definition 154 or 158 to confirm functionality (e.g., an alpha test or beta test audience).

Upon storage of a new device integration definition 154, in some embodiments, the device integration definition 154 is available to the device configuration engine 126 as a selectable type of device presented to the clients 104 connecting to the IIOT platform 102 via the web app user interface. In other implementations, the new sensor integration definition 158 may undergo additional processing prior to being made available to users outside of a certain community. The initial community, in some examples, may include the creator of the sensor integration definition (e.g., an individual user or the user's organization, such as the device manufacturer organization). The community may further include the system managers of the IIOT platform 102.

An integration management engine 132, in some implementations, manages the acceptance of new device integration definitions 154 and/or sensor integration definitions 158 and controls access to the integration definitions 154, 158 by clients 104. For example, the integration management engine 132, upon storage of a new integration definition 154, 158, may apply access controls limiting access to the creator user (or organization) as well as internal auditing user(s). Further, the integration management engine 132 may queue review of new integration definitions 154, 158 to one or more members of the IIOT platform 102 for review and approval. The member(s) of the IIOT platform 102 may conduct a review of the integration definition 154, 158 and, if approved, register approval with the integration management engine 132 for public dissemination of the integration definitions 154, 158. Rather than moving directly from limited access to public access, in some embodiments, a limited audience of clients 104 may be provided the opportunity to access the integration definition 154, 158. In some examples, access control may be supplied based on geography, type of organization (public organization, private organization, educational organization, utility, mining, industrial, etc.), size of deployment (number of aggregators 106, number of sensors/sensor devices 108, etc.), and/or sophistication of end client 104 (e.g., self-managed installation versus management by support staff of the IIOT platform 102).

The integration definitions 154, 158, in some implementations, are organized by category definitions 170. For example, a category definition engine 136 or the integration management engine 132 may accept identification of integration definitions 154, 158 by category. Each integration definition 154, 158 may be categorized into one or more categories, in some embodiments. The categories, in some examples, can include manufacture of the sensor or device 108, type of sensor or device 108 (e.g., vibrating wires that are strain gauges, etc.), and/or type of output of the sensor or device 108 (e.g., temperature, orientation, etc.).

The methods and engines provided by the IIOT platform 102 for creating device integration definitions 154 and sensor integration definitions 156 are designed to easily add new sensors and/or sensor devices 108 to the IIOT platform to gather information on behalf of the clients 104. The information, for example, may include data (e.g., readings) that are collected from the sensors and/or sensor devices 108 by the aggregators 106 via the aggregator management engine 146 and stored as sensor data 160 by the data archival engine 144. The data may further be combined and finessed by the metrics calculation engine using algorithms to generate the derived metrics 168. A metrics presentation engine 142 may in turn present metrics and/or derived metrics for review by the clients 104.

Figure 2A:
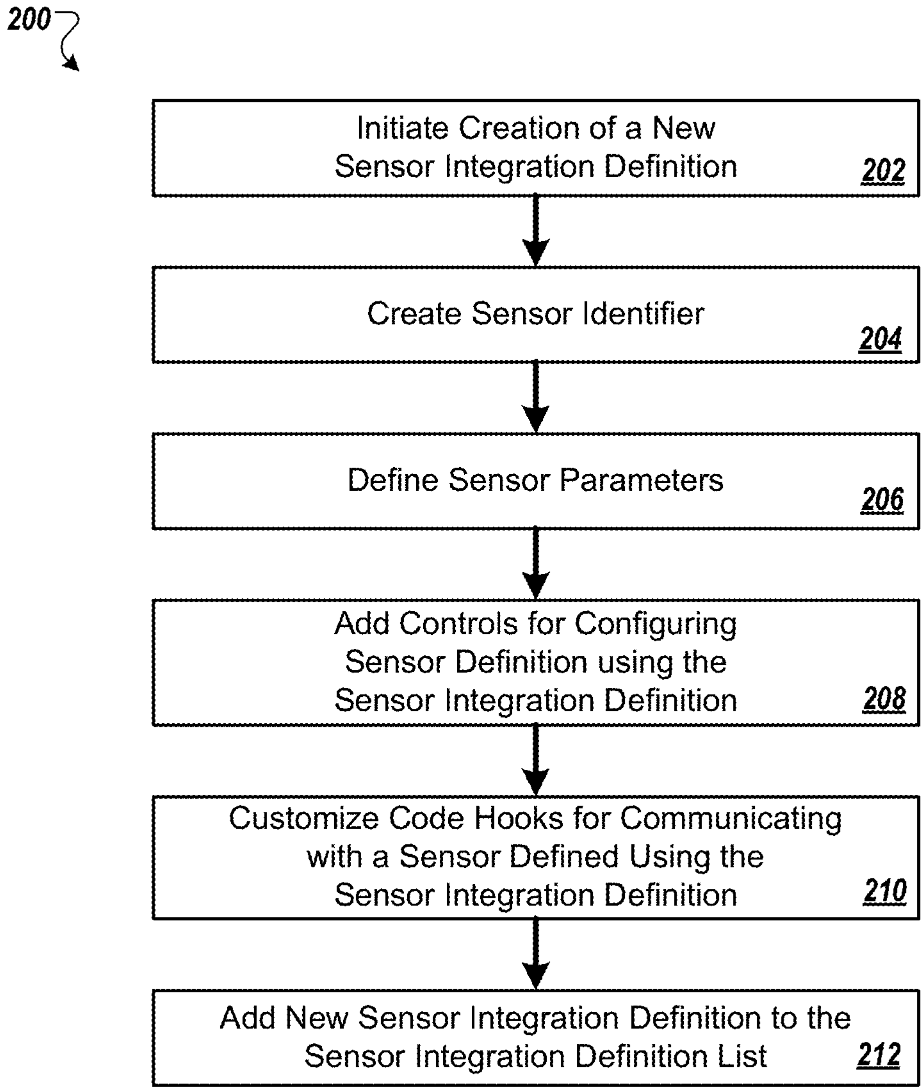
FIG. 2A is a flow chart of an example method for creating a new sensor integration definition.

Turning to FIG. 2A, a flow chart illustrates an example method 200 for creating a new device integration definition. The method 200, for example, may be performed by the sensor integration engine 128 of FIG. 1 to create a new sensor integration definition 158. The graphical user interface engine 138 may supply user interface support to guide a user communicating with the IIOT platform 102 via one of the clients 104 to create the new sensor integration definition 158.

In some implementations, the method 200 begins with initiating creation of a new sensor integration definition (202). A client 104 may upload information for creation of a new sensor integration definition, for example via the interface engine 120. The sensor integration engine 128 may receive the information and begin creating the sensor integration definition. In another example, the graphical user interface engine 138 may present an interactive user interface for one of the clients 104 (e.g., connecting via the web app user interface 122 or the interface engine 120) to guide the user through creation of the new sensor integration definition. In illustration, turning to FIG. 3A, an example screen shot 300 illustrates that a new sensor integration definition may be added to a list of sensor integration definitions 302 through selection of an add sensor integration control 304. Each sensor integration 302 may refer to a particular model of sensor for use with the IIOT platform 102 of FIG. 1. The screen shot 300, for example, may be generated by the graphical user interface engine 138 of FIG. 1 for entering selections relevant to the sensor integration engine 128 (e.g., add a new integration, edit one of the sensor integration definitions 302) or the sensor configuration engine 130 (add a sensor using a selected one of the sensor integrations 302). The sensor integration definitions 302, for example, may be part of the sensor integration definitions 158 of FIG. 1. Initiating creation of a new sensor integration definition 158, in some embodiments, may involve confirming user authorization for adding or editing sensor integrations within the system (e.g., the IIOT platform 102 of FIG. 1).

Figure 3B:
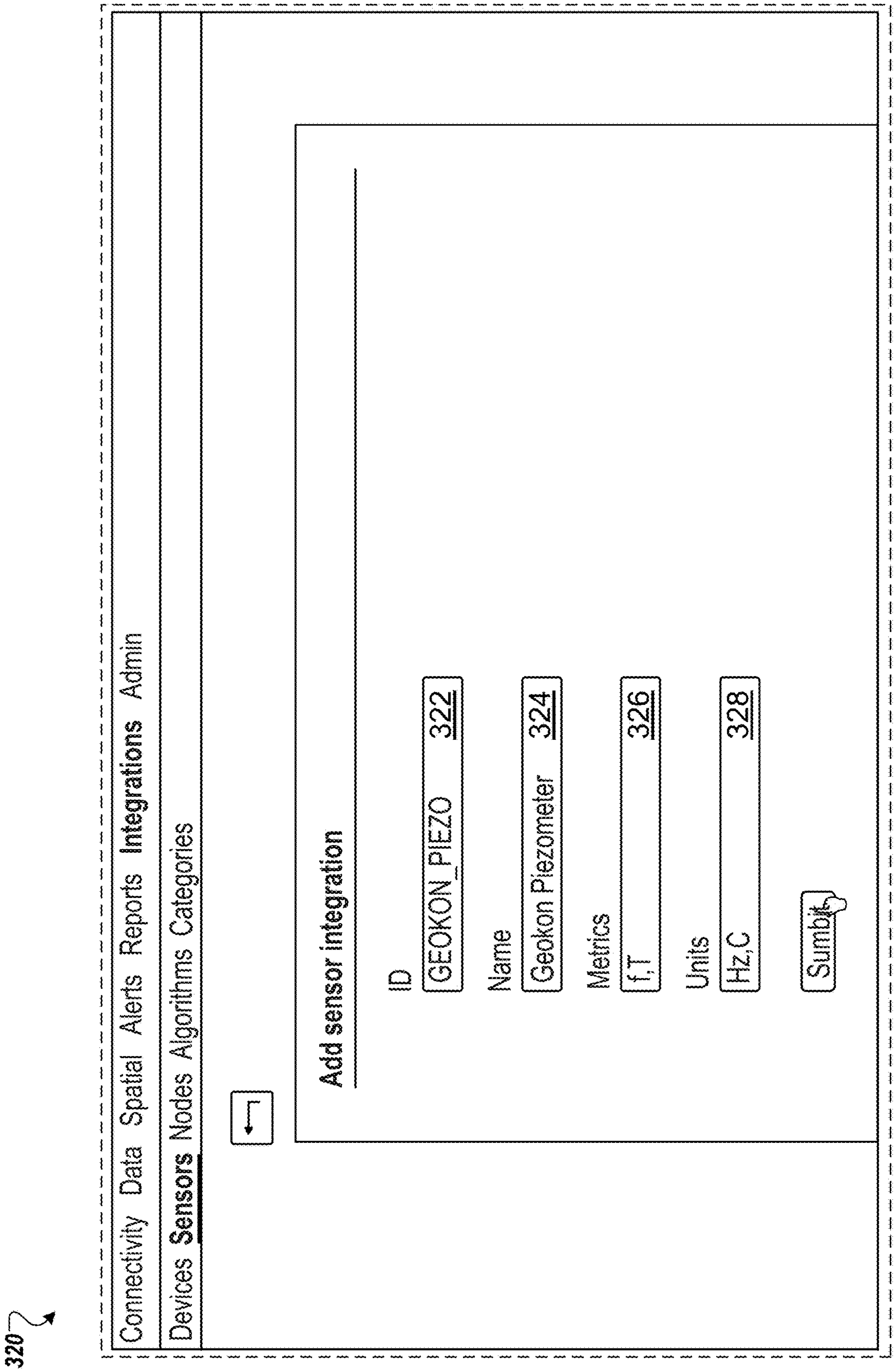

Returning to FIG. 2A, upon initiating creation of the new sensor integration definition (e.g., selecting the control 304), in some implementations, a sensor identifier is created for the new sensor integration definition (204). For example, the sensor integration engine 128 of FIG. 1 may create the sensor identifier based on information supplied by one of the clients 104. The graphical user interface engine 138 of FIG. 1 may enable, via a user interface, entry of sensor identification information for the new sensor integration definition. In illustration, turning to an example screen shot 320 of FIG. 3B, in some implementations, an identifier string control 322 (e.g., containing ID GEOKON_PIEZO) and/or an identifier name control 324 (e.g., containing name "Geokon Piezometer") provide a user with the ability to enter an identifier string and/or a name. In some embodiments, only one of an identifier or a name may be required. In other embodiments, both an identifier and a name may be required to create a new sensor integration definition. to uniquely identify the new sensor integration definition. The sensor identification information (e.g., identifier string, identifier name, etc.) may enable a user to easily identify a sensor integration definition (e.g., definitions 302 of FIG. 3A) as pertaining to a make and model of sensor that the user desires to add to its sensor network connected to an IIOT platform (e.g., platform 102 of FIG. 1). For example, as shown in FIG. 3A, each sensor integration definition 302 is associated with both an ID 306 and a name 308.

Returning to FIG. 2A, in some implementations, one or more sensor parameters are defined (206). The sensor parameters, for example, may include one or more metrics collected by the sensor defined by the sensor integration definition. Further, the sensor parameters may include a unit of measurement corresponding to each of the metrics. The sensor integration engine 128 may define the sensor parameters based on information supplied by one of the clients 104 of FIG. 1. The graphical user interface engine 138 of FIG. 1 may present a user interface for providing the information regarding the sensor parameter(s). Turning to FIG. 3B, for example, the screen shot 320 includes a metrics control 326 (e.g., containing "f, T") and a units control 328 (e.g., containing "Hz, C"). As can be seen, the first metric entered into the metrics control 326 represents frequency, while the first unit entered into the units control 328 represents Herz. Similarly, the second metric in metric control 326, temperature, corresponds to the second unit in units control 328, Celsius. Although illustrated as text entry controls in FIG. 3A, drop-down menus and/or selection boxes may be used to identify the various metrics and/or units associated with the metrics. Turning to FIG. 3A, a metrics column 310 identifies various metrics collected by sensors such as, in some examples, flow volume, flow rate, voltage, current, pressure, and/or humidity. Other metrics are possible. Each metric, as illustrated, includes a corresponding unit 312.

Returning to FIG. 2A, in some implementations, one or more controls are added for configuring a sensor definition using the sensor integration definition (208). The controls, for example, may include text box entries, drop down menus, radio buttons, selection boxes, or other controls configured to gather information relevant to the sensor make and model defined using the sensor integration definition. The controls, for example, may be added via the sensor integration engine 128 using control templates 166 of FIG. 1. The sensor integration engine 128 may receive information for adding the controls from one of the clients 104 communicating with the IIOT platform 102.

In some embodiments, the graphical user interface engine 138 presents an interactive user interface for obtaining information from one of the clients 104 for adding the one or more controls. Turning to FIGS. 3C and 3D, an example screen shot 340 includes a code entry pane 344 for editing code related to the sensor integration definition. The code entry pane 344, for example, may be provided through a selection of an edit control 348. In the code entry pane 344, as illustrated, the sensor integration definition is encoded in YAML data serialization language. In other embodiments, the code entry pane 344 may be encoded in JSON, RAML, PHP, JavaScript, or Python. The code entry pane 344 includes, starting at the top, the ID (e.g., derived from the ID control 322 of FIG. 3B), name (e.g., derived from the name control 324 of FIG. 3B), metrics (e.g., derived from the metrics control 326 of FIG. 3*b*, and units (e.g., derived from the units control 328 of FIG. 3B). Next, the pane 344 includes a code section for controls beginning at line 9.

Each control listed in the control section, in some implementations, may be added through a control templates menu 346. The control templates menu 346 includes a number of selectable templates which, upon selection by a user, populate a portion of editable code within the pane 344. As illustrated, controls have been added to the pane 344 from the control templates menu 246 for textInput 348*c* (beginning at line 10), zeroReferenceConfig 348*n* (beginning at line 26), formTimePicker 348*i* (beginning at line 42), and referenceSensorConfig 348*m* (beginning at line 47). As can be seen from the control templates menu 346, a generic control template may listed in addition to specialized (e.g., more detailed manufacturer templates, such as the calibrationFactors 348*t*, geokonCalibrationFactors 348*u* (see line 17 of code entry pane 344), and rstCalibrationFactors 348*v*. The user may edit the code added to the code entry pane 344 to customize each control to gather information related to the sensor being added through the new sensor integration definition. For example, at line 14, the textInput control has been labeled with "Index". Further, in some implementations, a user may add a new control or modify a more generic control to create a new control version, such as the manufacturer-specific calibration factors controls. The user, in some embodiments, may require a certain level of authorization within the system to create new types of controls.

Figure 6:
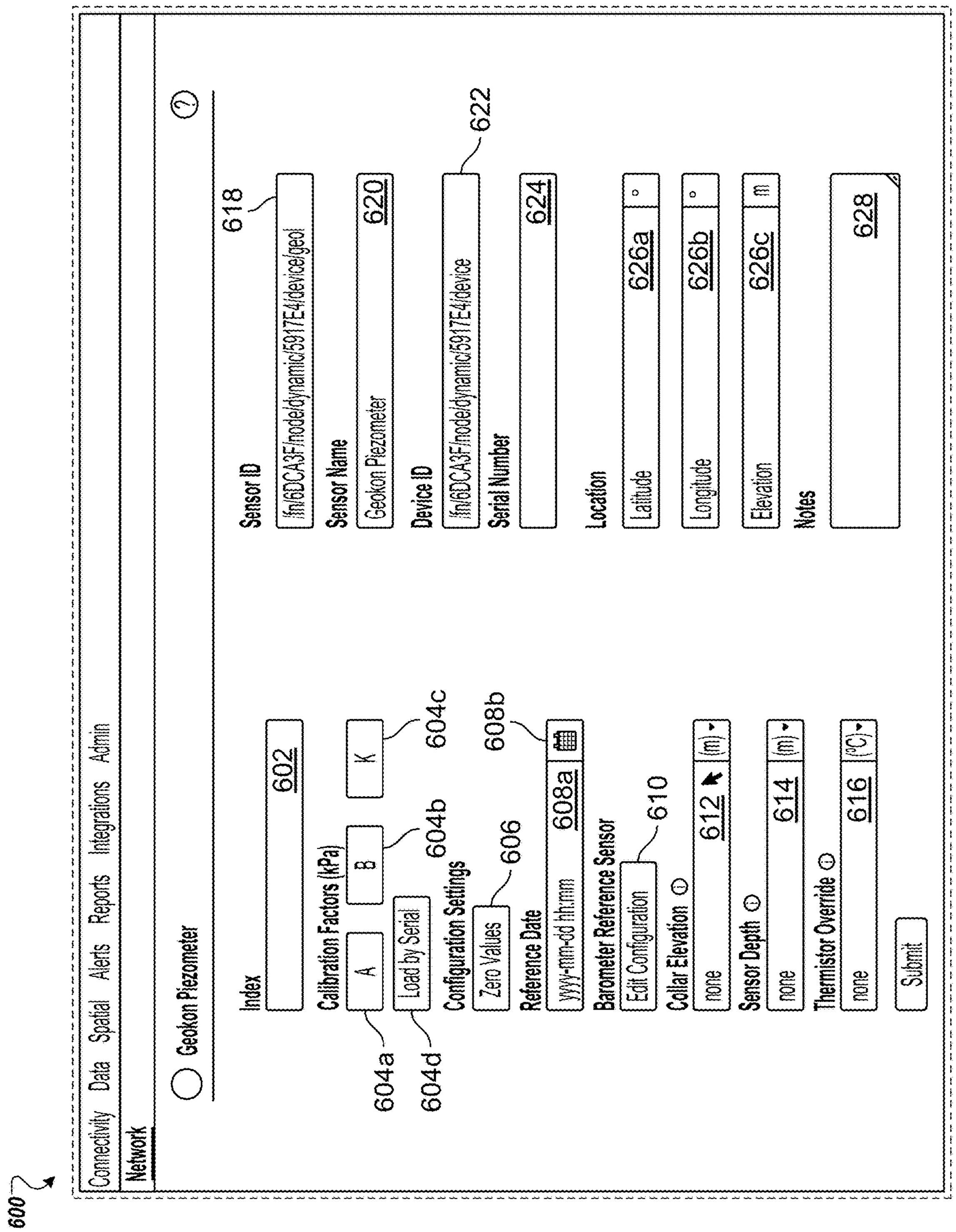
FIG. 6 illustrates an example screen shot of a user interface for adding a new sensor instance using a preexisting sensor integration definition.

Turning to FIG. 6, as illustrated in an example screen shot 600, the coded controls may be presented to a user when adding a new sensor to a sensor network connected to the IIOT platform. For example, the textInput control 348*c* appears as index text entry control 602. Further, the geokonCalibrationFactors control 348*u* appears as the selectable controls 604*a*, 604*b*, and 604*c*, the zeroReferenceConfig control 348*n* appears as configuration settings text entry control 606, and the formTimePicker control 348*i* appears as reference date calendar selector and text entry field 608. Additional controls 610-616 may be similarly added and customized using the code entry pane 344.

Returning to FIG. 2A, in some implementations, one or more code hooks are customized for communicating with a sensor defined using the sensor integration definition (210). In one example, a sensor-related code hook may be used to confirm that a particular sensor in a sensor array, mesh, or multiplexed network is appropriately configured for communication with the aggregator. In another example, a sensor-related code hook may be used to obtain a reading from a particular sensor.

In some implementations, the new sensor integration definition is added to the sensor integration definition list (212). For example, upon completion of creation of the sensor integration definition, the sensor integration definition may be added to the sensor integration definitions 158 of FIG. 1 by the integration management engine 132. For example, the new sensor integration definition may be available to other users for adding new sensor definitions to the IIOT platform 102 via the sensor configuration engine 130. Turning to FIG. 3A, the new sensor integration definition may be added to the list of sensor integration definitions 302 for user selection via the example user interface 300 (e.g., presented to one of the clients 104 by the graphical user interface engine 138 of FIG. 1).

Although illustrated as a particular series of steps, in other implementations, the steps of the method 200 may be performed in a different order. For example, the controls may be added for configuring the sensor definition (208) prior to or at the same time as defining the sensor parameters (206) (e.g., via the code editing pane 344 of FIG. 3C). Further, in other implementations more or fewer steps may be included. For example, prior to adding the new sensor integration definition to the sensor integration definition list, the new sensor integration definition may be tested by adding a sensor instance using the sensor integration definition and confirming appropriate configuration and intercommunication with the sensor instance. Other changes are possible while remaining in the scope and spirit of the method 200.

Figure 2B:
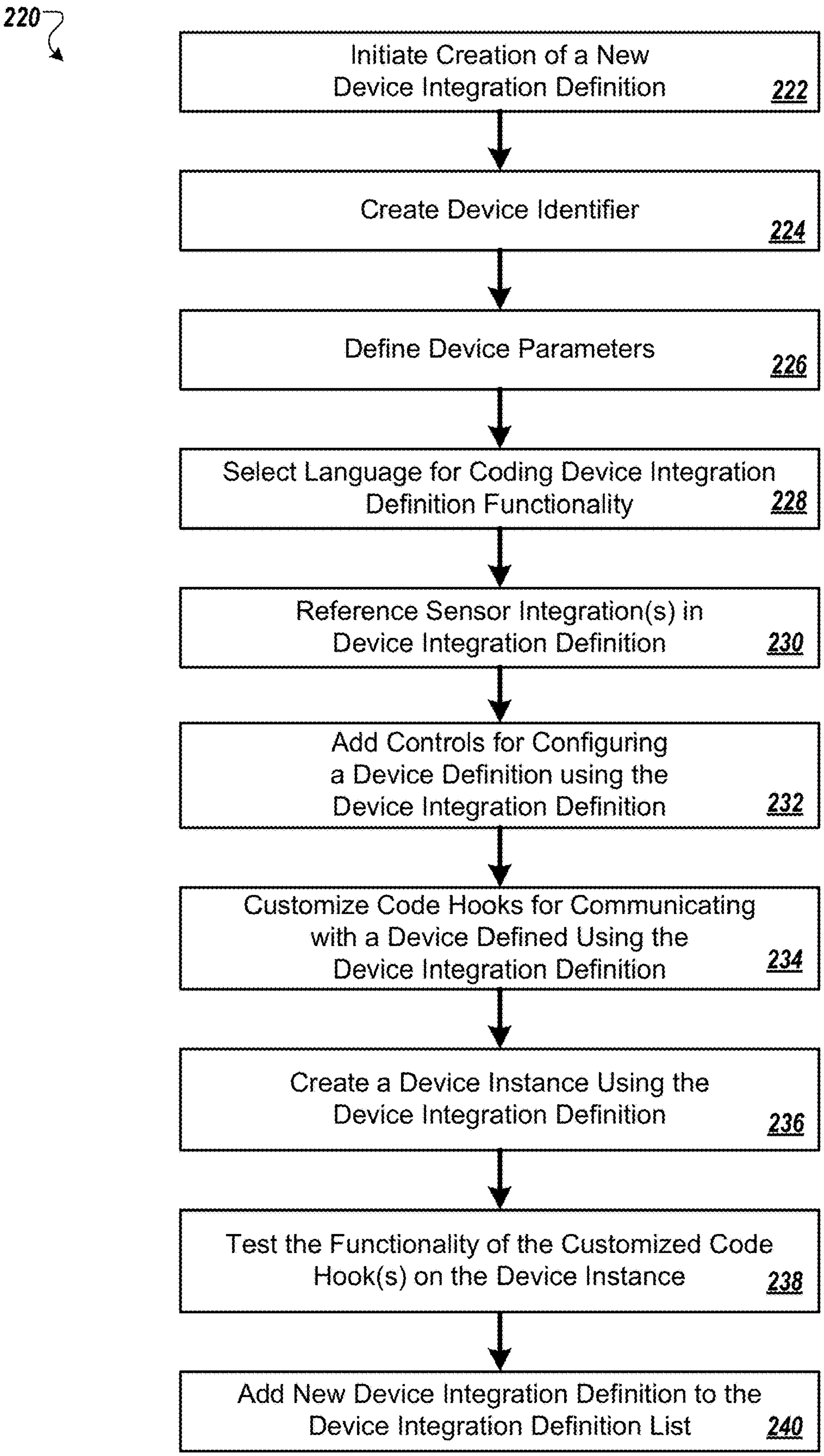
FIG. 2B is a flow chart of an example method for creating a new device integration definition.

Turning to FIG. 2B, a flow chart illustrates an example method 220 for creating a new device integration definition. The method 220, for example, may be performed by the device integration engine 124 of FIG. 1 to create a new device integration definition 154. The sensor integration engine 128 may additionally perform certain steps of the method 220 related to integrating one or more sensors of the new device described by the device integration definition. For example, portions of the method 200 of FIG. 2A, in some embodiments, is performed as part of the method 220 to create a device integration definition for a device having one or more sensors. The graphical user interface engine 138 may supply user interface support to guide a user communicating with the IIOT platform 102 via one of the clients 104 to create the new device integration definition 154.

In some implementations, the method 220 begins with initiating creation of a new device integration definition (222). A client 104 may upload information for creation of a new device integration definition, for example via the interface engine 120. The device integration engine 124 may receive the information and begin creating the device integration definition. In another example, the graphical user interface engine 138 may present an interactive user interface for one of the clients 104 (e.g., connecting via the web app user interface 122 or the interface engine 120) to guide the user through creation of the new device integration definition. For example, similar to creating a sensor integration, turning to FIG. 4A, an example screen shot 400 illustrates that a new device integration definition may be added to a list of device integration definitions 402 through selection of an add device integration control 404. Each device integration 402 may refer to a particular model of IIOT device for use with the IIOT platform 102 of FIG. 1. The screen shot 400, for example, may be generated by the graphical user interface engine 138 of FIG. 1 for entering selections relevant to the device integration engine 124 (e.g., add a new integration, edit one of the device integration definitions 402, etc.) or the device configuration engine 126 (e.g., add a device using a selected one of the device integrations 402). The device integration definitions 402, for example, may be part of the device integration definitions 154 of FIG. 1. Initiating creation of a new device integration definition 154, in some embodiments, may involve confirming user authorization for adding or editing device integrations within the system (e.g., the IIOT platform 102 of FIG. 1).

Figure 4A:
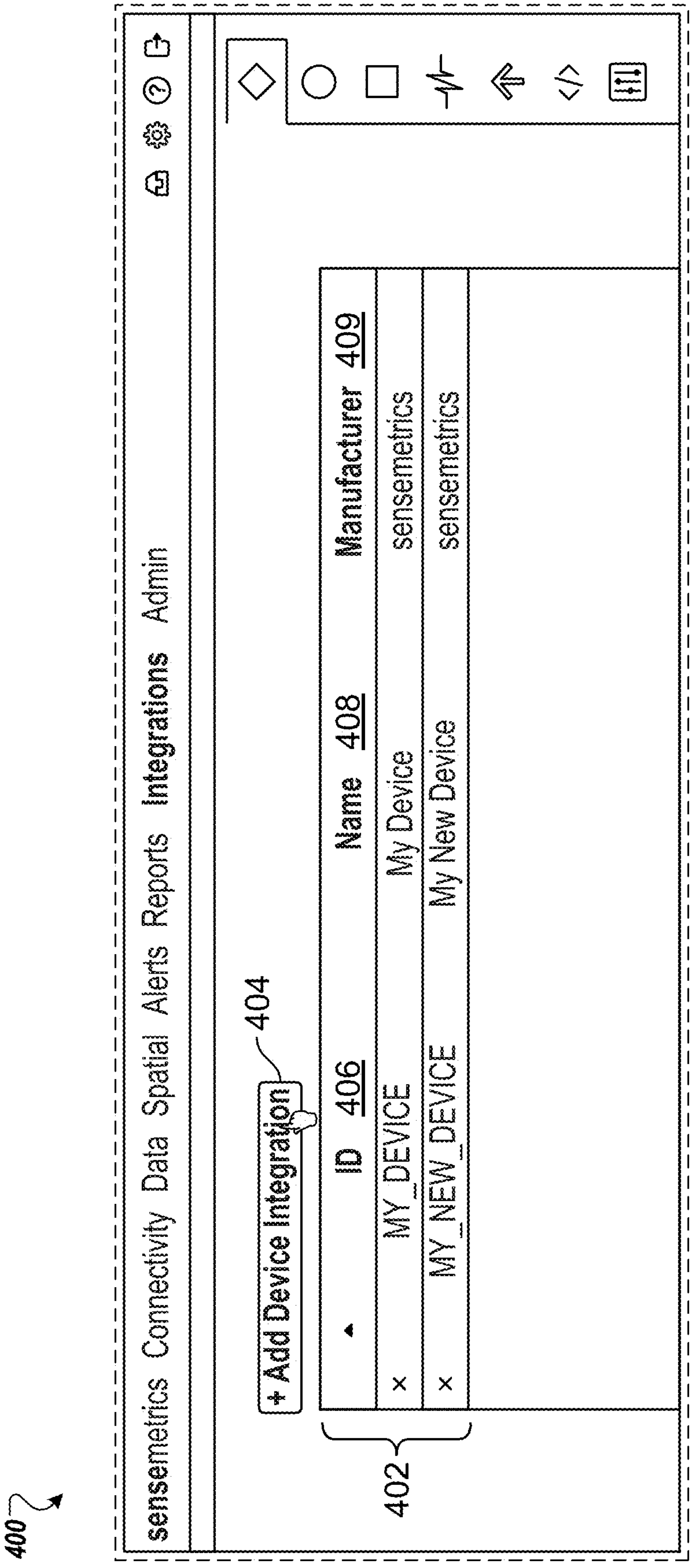

Returning to FIG. 2B, upon initiating creation of the new device integration definition (e.g., selecting the control 404), in some implementations, a device identifier is created for the new device integration definition (224). For example, the device integration engine 124 of FIG. 1 may create the device identifier based on information supplied by one of the clients 104. The graphical user interface engine 138 of FIG. 1 may enable, via a user interface, entry of device identification information for the new device integration definition. For example, the device integration engine 124 of FIG. 1 may enable, via a user interface, entry of device identification information for the new device integration definition. In illustration, turning to an example screen shot 410 of FIG. 4B, in some implementations, an identifier string control 412*a* (e.g., containing ID GEOKON_LC2_SINGLE) and/or an identifier name control 412*b* (e.g., containing name "Geokon LC-2 Single") provide a user with the ability to enter an identifier string and/or a name. In some embodiments, only one of an identifier or a name may be required. In other embodiments, both an identifier and a name may be required to create a new device integration definition. to uniquely identify the new device integration definition. Further, in some embodiments, the device identifier 412 may include a manufacturer 412*c* of the device (illustrated as "Geokon"). The device identification information 412 (e.g., identifier string, identifier name, manufacturer name, etc.) may enable a user to easily identify a device integration definition (e.g., definitions 402 of FIG. 4A) as pertaining to a make and model of device that the user desires to add to its IIOT device network connected to an IIOT platform (e.g., platform 102 of FIG. 1). For example, as shown in FIG. 4A, each device integration definition 402 is associated with an ID 406, a name 408, and a manufacturer 409.

Returning to FIG. 2B, in some implementations, one or more device parameters are defined (226). The device parameters, for example, may include communication parameters for communicating with the device defined by the device integration definition. The device integration engine 124 may define the device parameters based on information supplied by one of the clients 104 of FIG. 1. The graphical user interface engine 138 of FIG. 1 may present a user interface for providing the information regarding the device parameter(s). Turning to FIG. 4B, for example, a series of drop down menus allow a user to select various communication parameters 414*a*-414*c* via the example screen shot 410. The communications parameters 414*a*-414*c*, as illustrated, include an interface type 414*a* identifying a type of communications link that the device will use to communicate with the aggregator. The communications link, in some embodiments, is a wired or wireless communications link enabling serial or parallel communication. For example, wired serial communications links may include the interface type 414*a* of RS232 (as illustrated) or RS485. Further, the communication parameters may include a baud rate 414*b* identifying a speed of communication over the communication link. As illustrated, the baud rate is set to 9600 bits per second. In other embodiments, the communications link is an analog communications link, and communications parameters may include resistance, current, and/or voltage. Finally, as illustrated, the communication parameters 414*a*-414*c* may include a communications delimiter 414*c* for separating discrete messages destined for the device. In some examples, the communications delimiter 414*c* may include a comma, a carriage return (as illustrated "CR"), a semicolon, and/or a special character such as a "/R." Although illustrated as drop-down menus in FIG. 4B, text entry boxes, radio buttons and/or selection boxes may be used to identify the various communication parameters 414. Other communication parameters are possible. Further, in other embodiments, additional device parameters may be selected via a user interface such as the example interface 410. In some examples, additional device parameters can include communication flow control and/or communication error correction methods. For example, the communication device parameters may target issues that are particular to serial communications.

Returning to FIG. 2B, in some implementations, a language is selected for coding portions of the device integration definition functionality (228). The language may pertain to various languages accepted by the aggregator to use in configuring communication between the aggregator and the device. The aggregator, for example, may be designed to parse a variety of runtime executable scripting languages such as, in some examples, Java, Python, Perl, and/or JSON. In other embodiments, the language may include a visual language for building code segments in a language understood by the aggregator. The device integration engine 124 may define the language based on information supplied by one of the clients 104 of FIG. 1. The graphical user interface engine 138 of FIG. 1 may present a user interface for providing the information regarding the coding language. As illustrated in FIG. 4B, for example, a scripting language parameter 416 includes the selection of "Python."

In some implementations, one or more sensor integrations are referenced in the device integration definition (230). An IIOT device may include one or more sensors. Further, each sensor may be connected to or in communication with the device in differing manners. The sensor integrations may be selected, for example, from the sensor integration definitions 158 of FIG. 1. Further, the sensor connection (e.g., mount type) may be identified by the user to define how the sensor is connected to, in communication with, or integrated into the device. Additionally or alternatively, one or more new sensor integration definitions 158 may be added through the device integration engine 124 of FIG. 1 (e.g., with assistance from the sensor integration engine 128) at this time. The sensor integration definitions, for example, may be added in a manner similar to the sensor integration creation method described in relation to FIG. 2A.

Turning to FIG. 4B, in some embodiments, one or more sensor integrations are referenced in the device integration definition through selection of the sensor integration(s) in a graphical user interface such as the example user interface 410. As illustrated, a list of selectable sensor integrations 417 are presented to the user, each sensor integration 417 identifiable via a sensor integration identifier 418 (e.g., the identifier 322 and/or name 324 added via the example user interface 320 of FIG. 3B).

Further, in some embodiments, a mount type 419 may be defined for each selected sensor integration 417. The mount type 419, in some examples, may include a fixed mount (as illustrated), a variable number of sensors connected within a sensor array mount, and/or a variable number of sensors connected within a sensor mesh network or multiplexed mount.

Returning to FIG. 2B, in some implementations, one or more controls are added for configuring a device definition using the device integration definition (230). The controls, for example, may include text box entries, drop down menus, radio buttons, selection boxes, or other controls configured to gather information relevant to the device make and model defined using the device integration definition. The controls, for example, may be added via the device integration engine 124 using control templates 166 of FIG. 1. The graphical user interface engine 138 of FIG. 1 may present a user interface for adding one or more controls.

Turning to FIGS. 4C and 4D, an example screen shot 420 includes a code entry pane 424 for editing code related to the sensor integration definition. In the code entry pane 424, the device integration definition is encoded in YAML data serialization language. In other embodiments, the code entry pane 424 may be encoded in JSON, RAML, PHP, JavaScript, or Python. The code entry pane 424 includes, starting at the top, the communication parameters at lines 2 through 5 (e.g., derived from the communications parameters 414 of FIG. 4B), the identification parameters at lines 6 through 8 (e.g., derived from the identifying parameters controls 412 of FIG. 4B), and communications language (e.g., derived from the scripting language control 416 of FIG. 4B). The code entry pane 424 also identifies associated sensor GEOKON_PIEZO with a fixed mount type at lines 23-25 (e.g., derived from the sensors list 417 of FIG. 4B).

Next, the code entry pane 424 begins a controls section at line 26. Each control listed in the control section, in some implementations, may be added through a control templates menu 424. The control templates menu 424 includes a number of selectable templates which, upon selection by a user, populate a portion of editable code within the pane 424. As illustrated, controls have been added to the pane 424 from the control templates menu 426 for connectCodeInput at line 24 (e.g., thread-device 428*b*) and formSelect at line 35 (e.g., formSelect 428*g*). As can be seen from the control templates menu 426, a generic control template may listed in addition to specialized more detailed manufacturer templates, such as the calibrationFactors 348*t*, geokonCalibrationFactors 348*u*, and rstCalibrationFactors 348*v*. The user may edit the code added to the code entry pane 424 to customize each control to gather information related to the device being added through the new device integration definition. For example, at line 32, the connectCodeInput control has been labeled with "Thread Connect Code". Further, in some implementations, a user may add a new control or modify a more generic control to create a new control version, such as the manufacturer-specific calibration factors controls. The user, in some embodiments, may require a certain level of authorization within the system to create new types of controls.

Figure 5A:
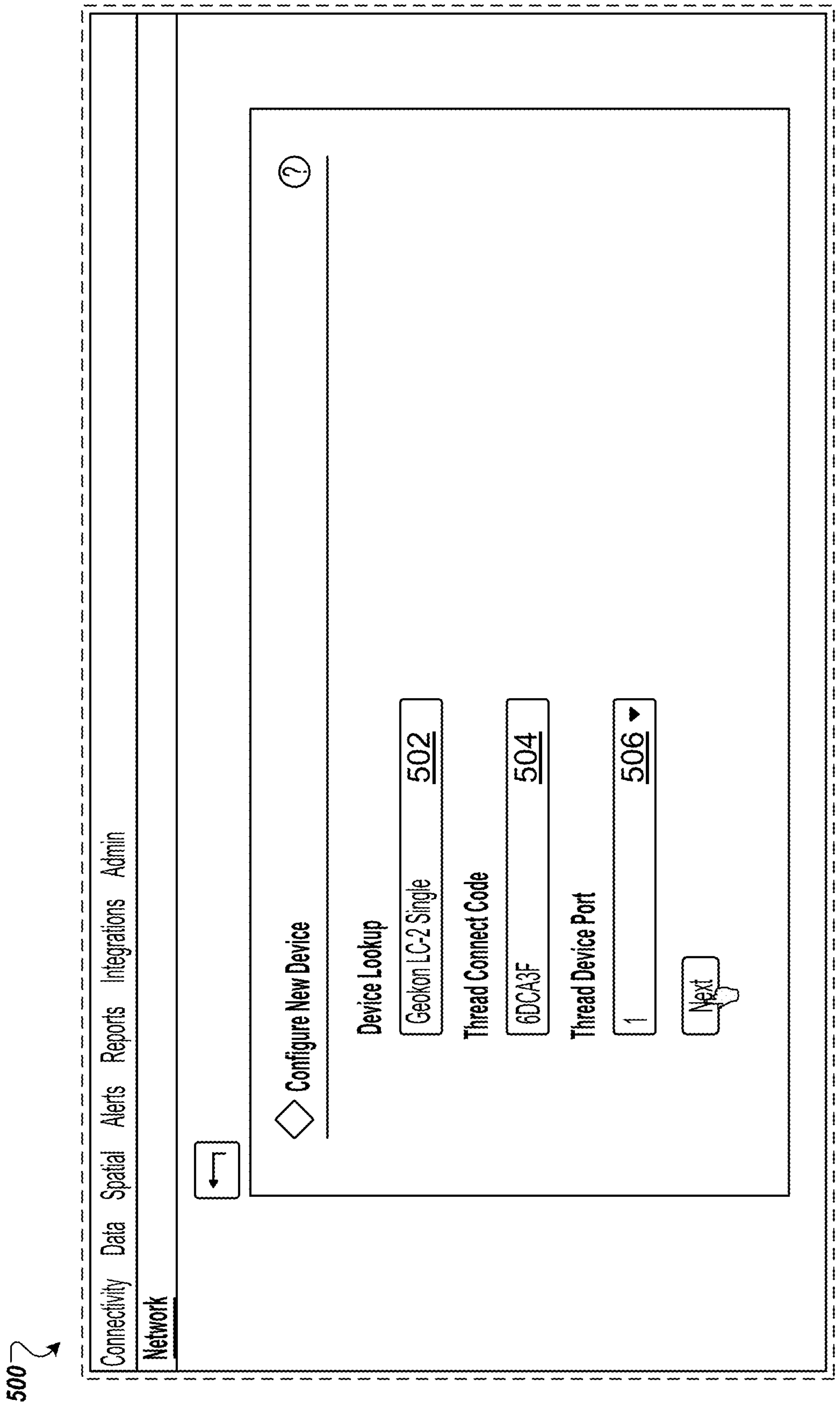
FIGS. 5A and 5B illustrate example screen shots of user interfaces for adding a new device instance using a preexisting device integration definition.

Turning to FIG. 5A, as illustrated in an example screen shot 500, the coded controls may be presented to a user when adding a new device to a device network connected to the IIOT platform. For example, the connectCodeInput control 428*b* appears as Thread Connect Code text entry control 504. Further, the formSelect control 428*g* appears as the drop-down menu "Thread Device Port" 506. Additional controls may be similarly added and customized using the code entry pane 424 of FIGS. 4C and 4D.

Returning to FIG. 2B, in some implementations, one or more code hooks are customized for communicating with a device defined using the device integration definition (234). The code hooks, for example, may include methods relevant to the device make and model defined using the device integration definition for initializing, communicating with, and monitoring the health of the device. The code hooks, for example, may be added via the device integration engine 124 using code hook templates 164 of FIG. 1. The code hook templates may provide pseudocode or editable algorithms representing secure, self-contained methods to customize the behavior of the device's integration with the IIOT platform (e.g., via an aggregator). The code hooks may be generated, for example, using the scripting language selected via the language control 416 of FIG. 4B. The graphical user interface engine 138 of FIG. 1 may present a user interface for selecting and/or editing one or more code hooks.

Figure 4E:
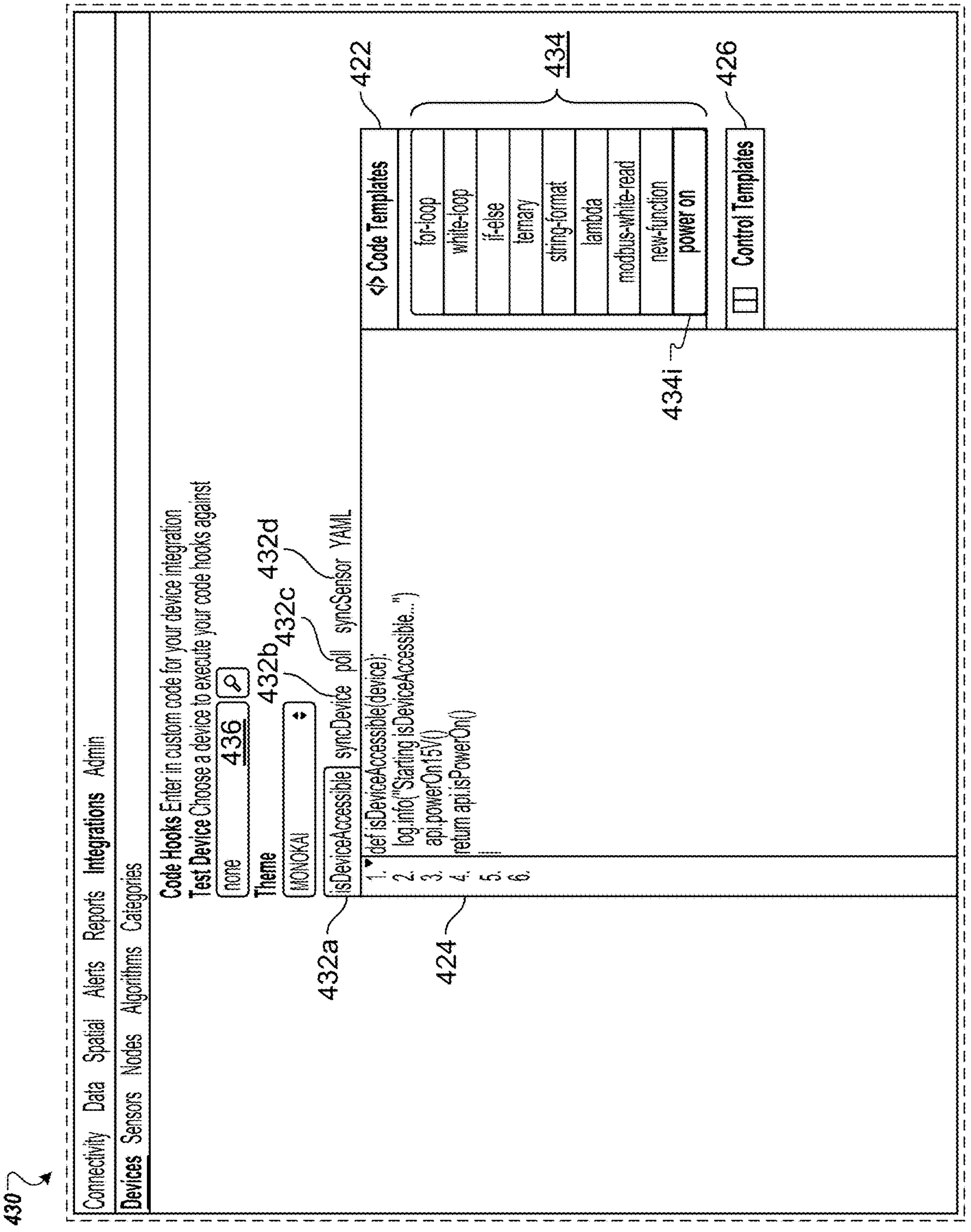

Turning to FIG. 4E, an example screen shot 430 includes a number of selectable tabs 432 each representing a separate code hook. A first tab 432*a* is selected, and the code hook isDeviceAccessible( ) is presented in the code editing pane 424. The code hook isDeviceAccessible( ), for example, may be used to ping the device to confirm that the device is in communication with the aggregator. Additionally, a code template menu 422 presents selectable code snippets 434 for adding common algorithmic constructs to the code hook draft presented in the code editing pane 424. As illustrated, a power-on code template 434*i* is selected, and lines 3 and 4 of the code editing pane 424 illustrate PowerOn functionality for the user to accept or edit. Thus, as edited, the code hook powers on the device and confirms that the device is powered on through a response (e.g., Boolean value) to the method isPowerOn.

Other code hooks represented by the tabs 432 include a syncDevice code hook at tab 432*b*, a poll code hook at tab 432*c*, and a syncSensor code hook at tab 432*d*. The syncDevice code hook, for example, may synchronize device settings (e.g., device property changes) downloaded to the aggregator with the effected device. The poll code hook, for example, may obtain an observation (e.g., metric reading) from one or more sensors of the device. Finally, the syncSensor, for example, may synchronize sensor settings (e.g., sensor property changes) downloaded to the aggregator with any effected sensor(s) of the device. Many additional code hooks are possible, according to different embodiments. In some embodiments, the code hooks represented by the tabs 432*a*-432*d* are default code hooks established for every device integration to provide basic functionality. Additional code hooks, for example, may be available for addition through a further menu.

Returning to FIG. 2B, in some implementations, a device instance is created using the device integration definition (236). To confirm accessibility of the new device type using the generated device integration definition, for example, a user may create a device instance to test the definition. The new device instance, in some embodiments, may be added by the device configuration engine 126 of FIG. 1 as a new device definition 154 for one of the sensor devices 108. The device instance may be created to communicate with one of the aggregators 106 of FIG. 1. The device instance may be created, for example, via a user interface such as presented in an example screen shot 500 of FIG. 5A.

Figure 2C:
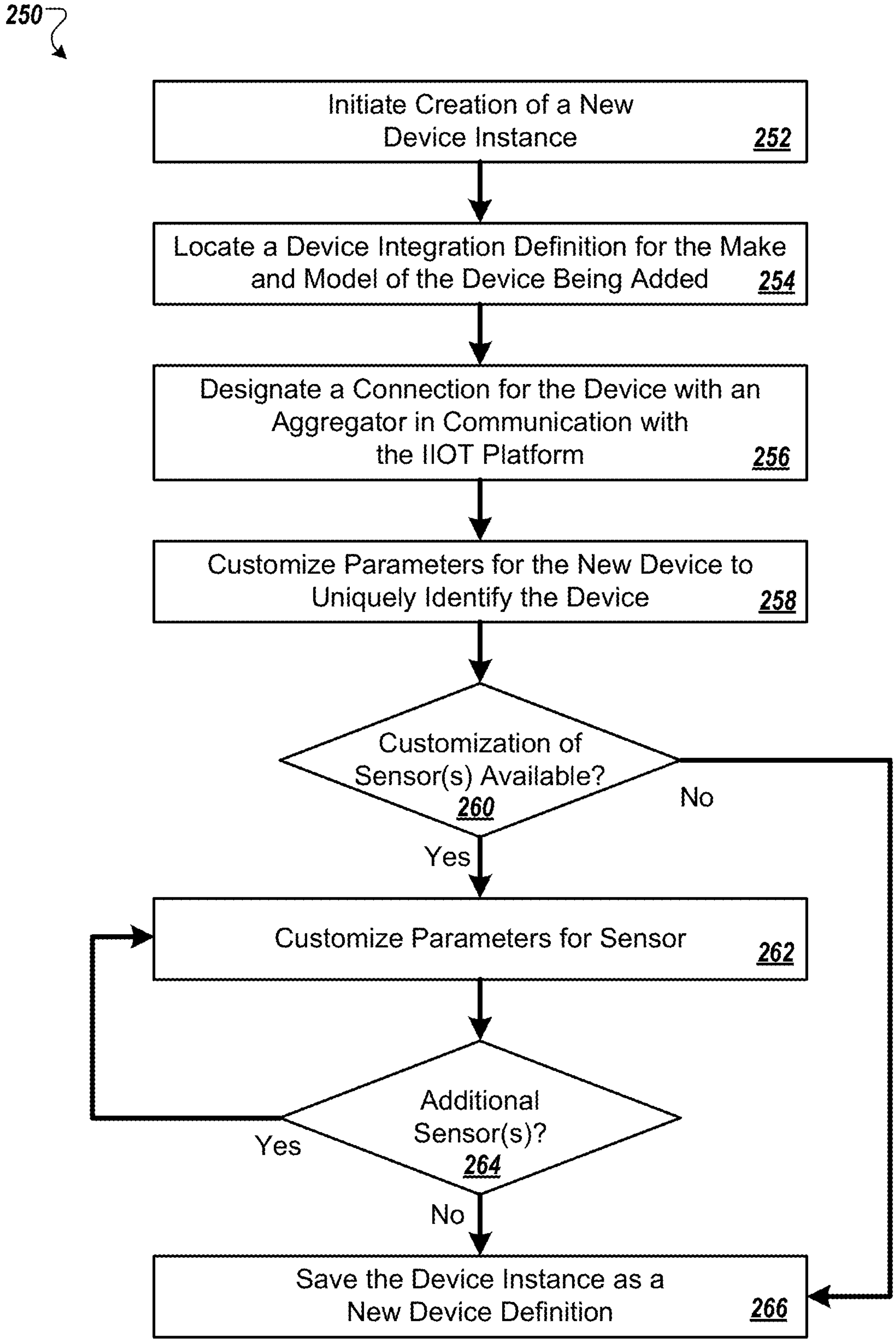
FIG. 2C is a flow chart of an example method for adding a new device instance using a preexisting device integration definition.

The device instance is created, in some embodiments, using a process such as an example method 250 of FIG. 2C. The method 250 may be performed by the device configuration engine 126 of FIG. 1 to add a new device 108 to the IIOT platform environment 100. In some embodiments, the method 250 is enabled in part through graphical user interfaces presented by the graphical user interface engine 138 for presentation to a given client 104 communicating with the IIOT platform 102 through the web app user interface 122 or another API 120.

Turning to FIG. 2C, in some implementations, the method 250 begins with initiating creation of a new device instance (252). A client 104 may connect to the interface engine 120 or web app user interface 122 and access a graphical user interface prepared by the graphical user interface engine 138 for guiding the user through creation of a new device instance. For example, the new device instance may be initiated through the device configuration engine 126 of FIG. 1 to add a new device 108 to the IIOT network environment 100.

In some implementations, a device integration definition for the make and model of the device being added may be located (254). The device integration definition, for example, may be one of the device integration definitions 154 organized by the integration management engine 132 of FIG. 1. The device configuration engine 126 of FIG. 1 may obtain a list of available device integration definitions 154 from the integration management engine 132. The device integration definition may be located via a graphical user interface presented by the GUI engine 138 of FIG. 1. For example, turning to FIG. 4A, a device integration definition may be selected from the device integration list 402. In another example, turning to FIG. 5A, a device integration definition may be accessed through looking up a device model name via a device look-up search control 502.

Returning to FIG. 2C, a connection for the device with an aggregator in communication with the IIOT platform, in some implementations, is designated (256). Each aggregator 106, for example, may include a number of connection points for communicating with a number of different IIOT devices. The aggregator management engine 146 of FIG. 1 may be used to identify an aggregator and an appropriate connection point (e.g., physical or wireless communication port) with a selected aggregator 106. In some embodiments, the GUI engine 138 of FIG. 1 may present one or more user interfaces for selecting an aggregator connected to the IIOT platform and for obtaining information related to the connection for the device with the aggregator. As illustrated in FIG. 5A, for example, a connection code 504 for connecting to the aggregator is obtained, along with a device port 506. The connection code 504, for example, may uniquely identify the aggregator to which the device identified in the device look-up control 502 is physically or communicatively connected via the port 506.

In some implementations, parameters for the new device are customized to uniquely identify the device (258). The parameters, for example, can include a device identifier, a device name, and/or a physical location of the device. The parameters may be provided by one of the clients 104 of FIG. 1 to the device configuration engine 126 via one of the interface engine 120 and the web app user interface 122. For example, the graphical user interface engine 138 of FIG. 1 may present one or more user interfaces to one of the clients 104 for guiding the user through entering the device parameters. In illustration, turning to FIG. 5B, an example screen shot 520 includes a device identifier control 522 and a device name control 524 for uniquely referencing the newly configured device instance. The device identifier 522, for example, may be automatically generated by the IIOT platform, while the device name 524 is a recognizable unique name applied by the user. Further, the screen shot 520 includes a series of location controls 526*a*, 526*b*, and 526*c* for providing a geographical location of the newly configured device instance. As illustrated, the location controls 526 include a latitude control 526*a*, a longitude control 526*b*, and an elevation control 526*c*. Other reference coordinates, such as GPS coordinates, may alternatively be used to identify the location of the newly configured device instance. Further, a notes text entry control 528 provides the user with an opportunity to include additional client-specific details related to the newly configured device instance.

Returning to FIG. 2C, in some implementations, customization parameters are available for one or more sensors of the device (260). The customization parameters, for example, can include sensor calibration factors, sensor location, sensor configuration settings, and/or sensor identification information. The customization parameters may be provided by one of the clients 104 of FIG. 1 to the device configuration engine 126 or the sensor configuration engine 130 via one of the interface engine 120 and the web app user interface 122. For example, the graphical user interface engine 138 of FIG. 1 may present one or more user interfaces to one of the clients 104 for guiding the user through entering the sensor customization parameters.

Turning to FIG. 6, for example, the example screen shot 600 presents controls for configuring a sensor having sensor a sensor identifier presented in a sensor identification control 618. The sensor belongs to a device identified in a device identification control 622.

The user may enter, via the user interface presented in the screen shot 600, sensor identification information including a sensor name 620 and a serial number 624.

Further, a series of location controls 626 allow the user to specify location information including a latitude 626*a*, a longitude 626*b*, and an elevation 626*c* of the sensor. Additionally, location information may include, in deployments involving a well, a collar elevation control 612 for defining the elevation of the top of the well the sensor is installed in and a sensor depth control 614 for defining a distance between the collar elevation and an installation location of the sensor. In other embodiments, a structure height control (not illustrated) may be used to collect a height of a structure from the base to the top of the structure (e.g., for use in measuring tilt metrics), a structure azimuth control (not illustrated) may be used to collect information setting directional orientation of a structure, and/or a sensor azimuth control (not illustrated) may be used to collect information setting direction orientation of the sensor.

The user may further enter configuration settings for calibrating and/or initializing the sensor. For example, the user may enter configuration settings into a configuration settings control 606 representing initial values for the sensor that may be used as a reference for calculating more accurate readings. As illustrated, the user may specify a series of calibration factors 604*a*, 604*b*, 604*c* for calibrating the specific sensor. For example, the calibration factors 604*a*, 604*b*, 604*c* may be provided by the manufacturer in materials shipped with the sensor, specifying that sensor's unique calibration factors. Alternatively, the calibration factors may be loadable in reference to the serial number 624 by selecting a load by serial control 604*d*. A sampling interval control (not illustrated) may be used to define how often a sensor will take readings. Other configuration settings, in some examples, may include a reference date control 608 for entering a first date to use where calculating an amount of change over time, a rolling interval control (not illustrated) for setting a moving time window for calculating change over time, Other settings are possible. For example, a barometer reference control 610 may be used to select a reference sensor for use in obtaining barometric pressure readings for use when adding a piezometer type sensor instance. Conversely, a piezometer reference control (not illustrated) may be used to select a reference sensor for use in obtaining liquid pressure readings when adding a barometer type sensor instance. A thermistor override control 616 may accept an approximate temperature for use in obtaining readings in the circumstance that the thermistor element in the sensor ceases to function. Finally, a notes text entry control 628 may be provided for users to enter further information identifying or characterizing the sensor instance.

Returning to FIG. 2C, in some implementations, parameters are customized for each sensor (262) until no additional sensors are available for customizing (264). The number of sensors may be known in advance (e.g., fixed sensors within a device) or specified by the user (e.g., an array or mesh of sensors connected to a device). In some embodiments, the client 104 may specify in advance a total number of sensors. In other embodiments, the client 104 may continue to add individual sensors via a user interface until designating that the configuration is complete. In embodiments where the client 104 supplies a file containing configuration details, the device configuration engine 126, in tandem with the sensor configuration engine 130, may parse and configure sensors for the device instance until reaching the end of the sensor configuration section of the file. In some embodiments, each sensor configuration is stored (e.g., by the sensor integration engine 128 of FIG. 1) as a separate sensor definition 156. The configuration archival engine 134, for example, may manage storage of each sensor definition 156.

In some implementations, the device instance is saved as a new device definition (266). For example, the device configuration engine 126 may save the device instance as one of the device definitions 152. The configuration archival engine 134, for example, may manage storage of the device definition 152.

Although illustrated as a particular series of steps, in other implementations, the steps of the method 250 may be performed in a different order. For example, in other embodiments, one or more sensors may be customized (262) prior to customizing device parameters (258) and/or designating the connection for the device with the aggregator (256). Further, in other implementations more or fewer steps may be included. For example, the device integration definition may not be located in the circumstance that the device instance is created as a test device for testing an in-progress creation of a device integration definition. Other changes are possible while remaining in the scope and spirit of the method 220.

Returning to FIG. 2B, in some implementations, the functionality of the customized code hook(s) is tested on the device instance (238). For example, testing may be initiated by one of the clients 104 via the interface engine 120 or web app user interface 122, for example through the device integration engine 124. In response, the device integration definition 154 including the code hook for testing may be provided by the device integration engine 124 to the aggregator management engine 146 for sharing with the aggregator 106 connected to the test device 108. The aggregator 106 may in turn response to the IIOT platform 102 with the result of executing the code hook against the test device 108. The result may be provided back to the device integration engine 124 for presentation to the client 104 via the interface engine 120 or web app user interface 122 (e.g., being presented by the graphical user interface engine 138).

Figure 4G:
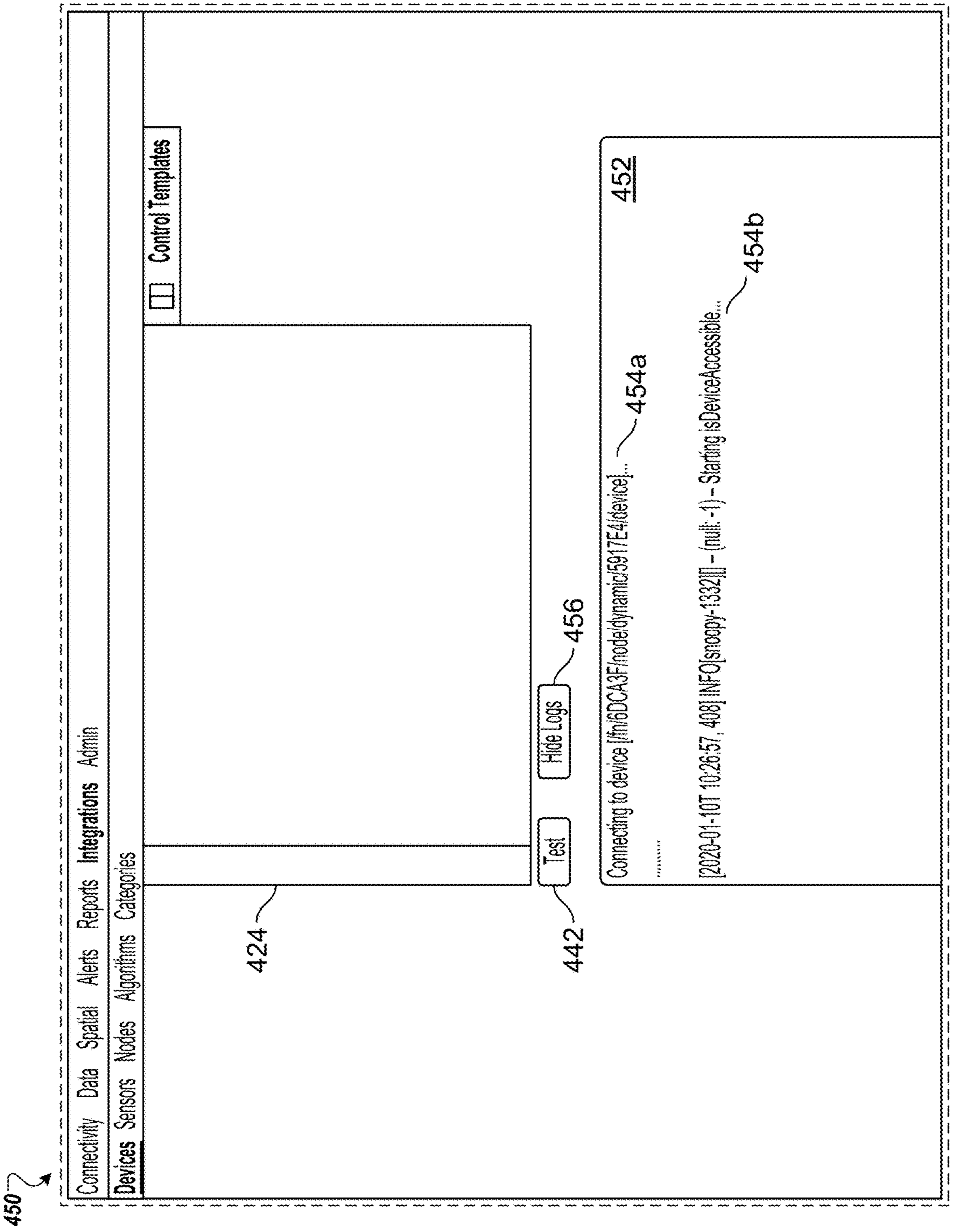

In illustration, turning to FIG. 4E, the example screen shot 430 includes a test device control 436 for identifying a test device to use for testing the code hooks 432*a*, 432*b*, 432*c*, and/or 432*d*. A user may select the new device instance for testing the code. Moving to FIG. 4F, an example screen shot 440 illustrates a lower portion of the user interface presented in the example screen shot 430. As illustrated, a test control 442, when selected, initiates testing of the selected code hook (e.g., code hook 432*a* for "isDeviceAccessible"). Further, as illustrated in FIG. 4G, an example screen shot 450 illustrates a log pane 452 presented beneath the code editing pane 424 responsive to selection of the test control 442. The log pane, as illustrated includes two log statements 454—a statement 454*a* identifying that the IIOT platform is connected to the test device via the aggregator, and a statement 454*b* identifying that the code hook isDeviceAccessible is being executed. Returning to FIG. 4F, the call to log.info at line 2 of the code hook 432*a* causes presentation of the statement 454*b*. If the code hook test succeeds, the user may run further tests against the other code hooks 432*b*, 432*c*, and 432*d*. If, instead, the code hook test fails, the user may revisit the integration definition to determine whether any parameters should be added and/or changed to enable intercommunication between the aggregator and the test device.

Figure 7A:
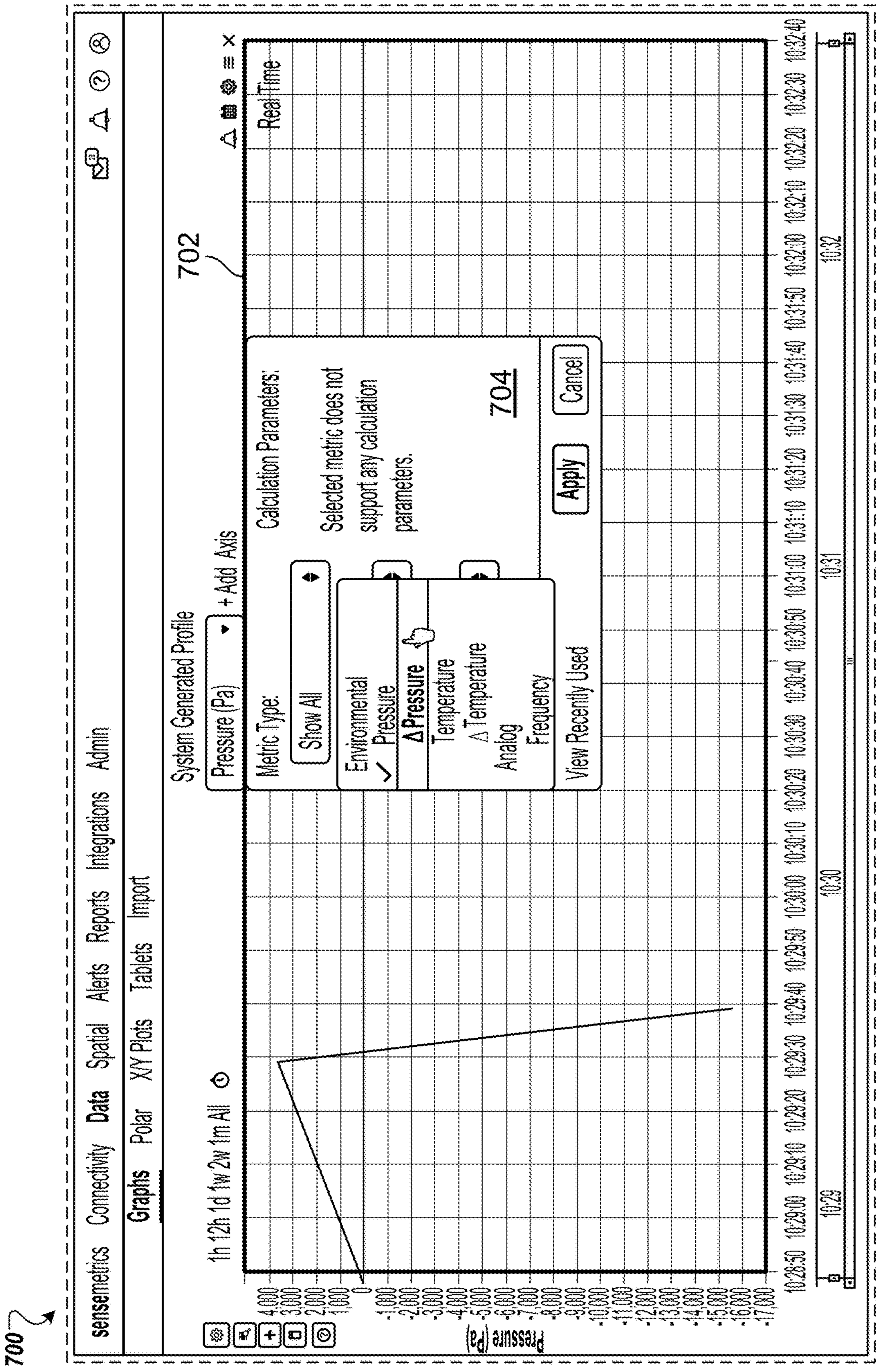
FIGS. 7A and 7B illustrate example screen shots of user interfaces for viewing metrics derived from sensors integrated into an IIOT platform environment.
Figure 7B:
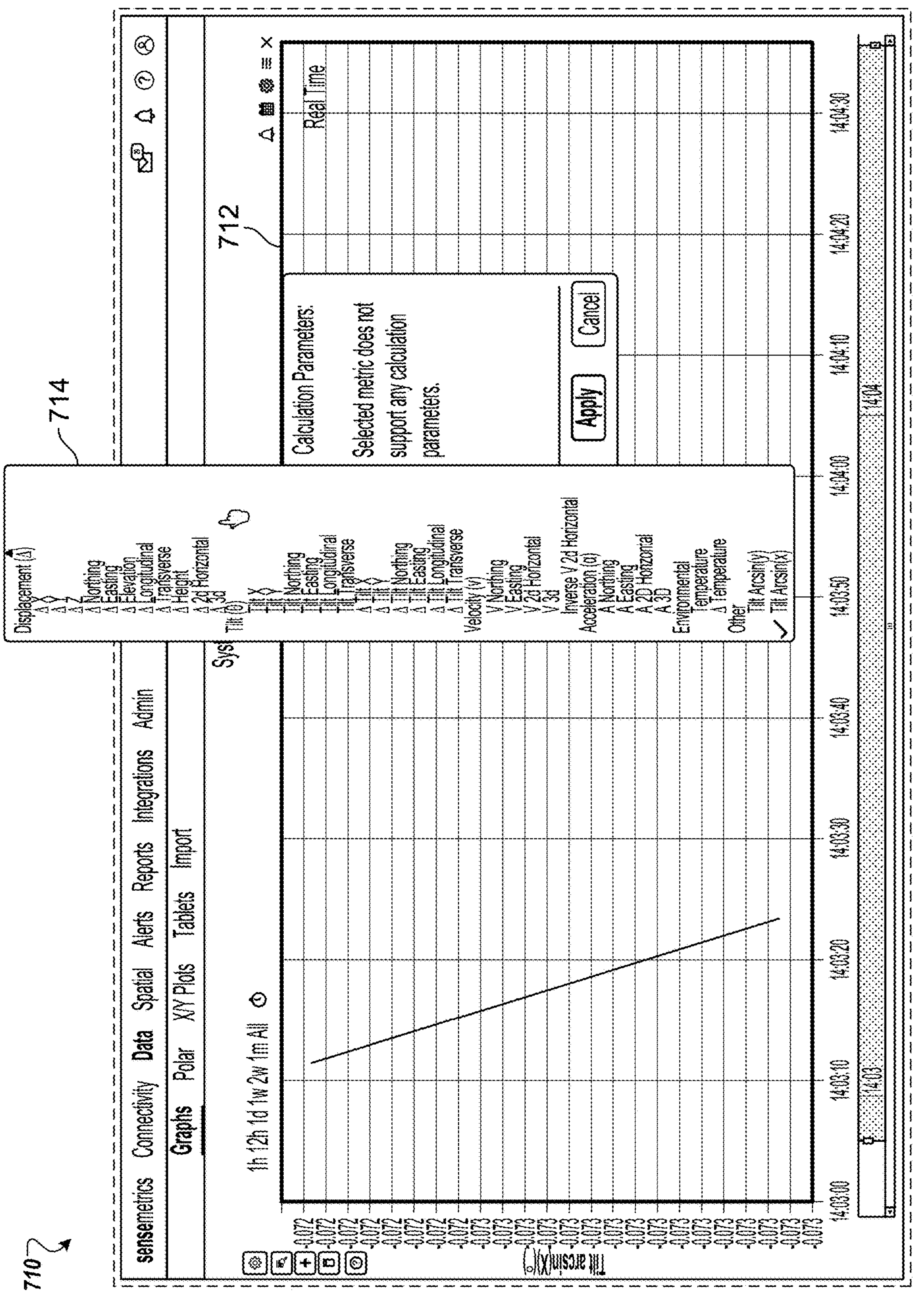

In some implementations, testing a code hook, such as the code hook poll 432*c*, may involve confirming readings received from the test device and/or derived metrics obtained from the test device. Turning to FIG. 7A, an example screen shot 700 illustrates a graph 702 of pressure readings taken over time. A menu 704 presents additional metrics available for presentation to the user. Turning to FIG. 7B, further metrics available for presentation to the user are illustrated in a menu 714 of screen shot 710. A derived metric of tilt arcsin(X) is plotted in a graph 712 of FIG. 7B. The derived metric, for example, may utilize certain information entered when configuring the sensor used to obtain the readings that generate the information presented in the graph 712. As discussed above in relation to FIG. 6, for example, calibration factors 604, configuration settings 606, reference date 608, collar elevation 612, sensor depth 614, and/or thermistor override 616 may each effect the results of calculations presented within derived metrics.

Returning to FIG. 2B, in some implementations, after satisfactory testing of the code hook(s), the new device integration definition is added to the device integration definition list (240). For example, upon completion of creation of the device integration definition, the device integration definition may be added to the device integration definitions 154 of FIG. 1. For example, the new device integration definition may be available to other users for adding new device definitions to the IIOT platform 102 via the device configuration engine 126. Turning to FIG. 4A, the new device integration definition may be added to the list of device integration definitions 402 for user selection via the example user interface 400.

Although illustrated as a particular series of steps, in other implementations, the steps of the method 220 may be performed in a different order. For example, the controls may be added for configuring the device definition (232) prior to or at the same time as defining the device parameters (226) (e.g., via the code editing pane 424 of FIGS. 4C and 4D). Further, in other implementations more or fewer steps may be included. For example, in other embodiments, language options may not be available for selection (228). Other changes are possible while remaining in the scope and spirit of the method 220.

Figure 8:
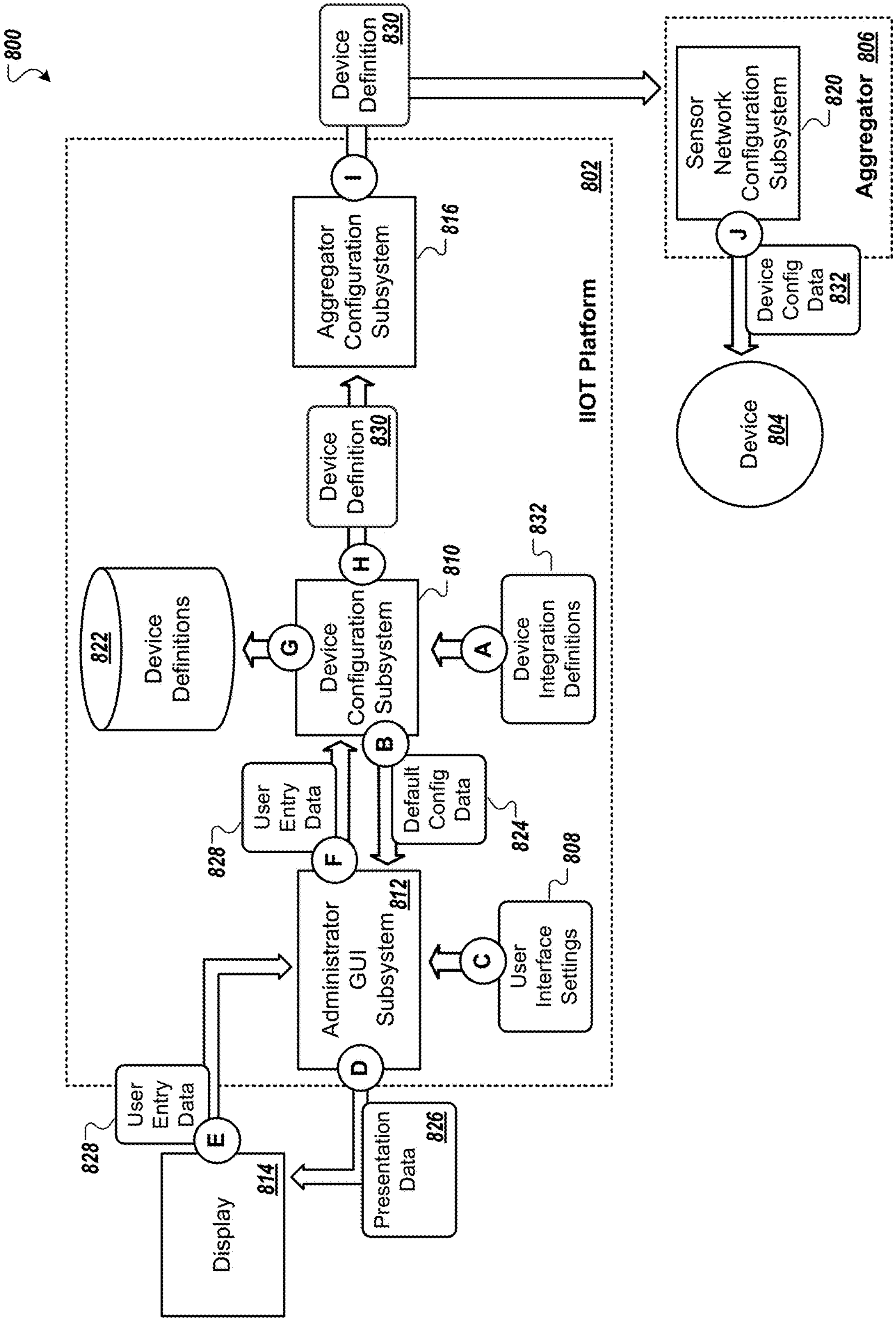
FIG. 8 is a flow diagram of an example process for adding a new device to an IIOT platform using a preexisting device integration definition.

Turning to FIG. 8, a block diagram illustrates an example process flow 800 for adding a new device instance 804 to an IIOT platform 802 via an aggregator 806 using a preexisting device integration definition 834. The process flow 800, for example, may be performed by IIOT platform 102, Aggregators 106, and clients 104 of the environment 100 of FIG. 1. Portions of the process flow may incorporate steps of the method 250 of FIG. 2C.

In some implementations, the process flow 800 begins within an IIOT platform 802 (such as the IIOT platform 102 of FIG. 1) with one of a set of device integration definitions 834 being provided to a device configuration subsystem 810. The device integration definition 834, for example, may have been requested by the device configuration subsystem in response to selection of a control identifying the type of device being added to the IIOT platform 802, such as a make and model of the device. In example, a user may have selected a device from the device integration list 402 of the screen shot 400 of FIG. 4A. The device integration definition 834 may be accessed from a data storage device and/or database. In illustration, as shown in FIG. 1, the device integration definition 834 may be one of the device integration definitions 154 stored in the data repository 110.

The device configuration subsystem 810, in some implementations, extracts default configuration data 824 from the device integration definition 834. The device configuration subsystem 810, for example, may execute operations performed by the device configuration engine 126 described in relation to FIG. 1. The default configuration data 824 may include one or more controls for obtaining information related to the device, such as, in some examples, a thread port, a location of deployment, and/or one of multiple optional communication frequencies for communicating with the device. Further, the default configuration data 824 may include configuration data related to one or more sensors included within or designed for communication with the device. In some examples, the sensor-related configuration data 824 may include calibration factors, configuration settings, a sensor depth, and/or a connection type with other sensors (e.g., if deployed in a daisy-chained, multiplexed, or mesh fashion).

In some implementations, the device configuration subsystem 810 provides the default configuration data 824 to an administrator graphical use interface (GUI) subsystem 812. The administrator GUI subsystem 812, for example, may perform operations of the graphical user interface engine 138, the interface engine for API clients 120, and/or the web application user interface 122 of FIG. 1.

The administrator GUI subsystem 812, in some embodiments, accesses user interface settings 808. The user interface settings 808 may guide what information is presented to the end user and/or how the information is displayed to the end user. The user interface settings 808, in some examples, may include a user access level (e.g., user access level (e.g., platform administrative privileges, sensor/device network configuration/reconfiguration privileges, sensor monitoring privileges, etc.), user history (e.g., frequently accessed device integration definitions), user GUI preferences/settings, and/or device specific GUI settings (e.g., browser versions, portal, handheld computer, etc.).

In some implementations, the administrator GUI subsystem 812 generates presentation data 826 for presenting a configuration user interface to the end user. The presentation data 826, for example, may include graphical elements, such as controls, for presenting the default configuration data 824 to the end user and to accept customization of portions of the default configuration data 824. The presentation data 826, for example, may include a number of files such as cascading style sheets (CSS), one or more hypertext mark-up language (HTML) files, and/or JavaScript files. The administrator GUI subsystem 812 may deliver the presentation data 826 to a computing device of an end user via a network (not illustrated) for presentation at a display 814. The end user, for example, may be one of the clients 104 of FIG. 1.

The display 814, for example, may be presented on a monitor, the display of a smart phone or tablet computer, or on a dashboard display on industrial equipment or an industrial vehicle. A user may interact with the controls presented in the display 814 to configure a device (or, alternatively, a sensor) for interaction with the IIOT platform 802. In an illustrative example, the display 814 may include information similar to the screen shot 500 of FIG. 5A and/or screen shot 520 of FIG. 5B.

Figure 5B:
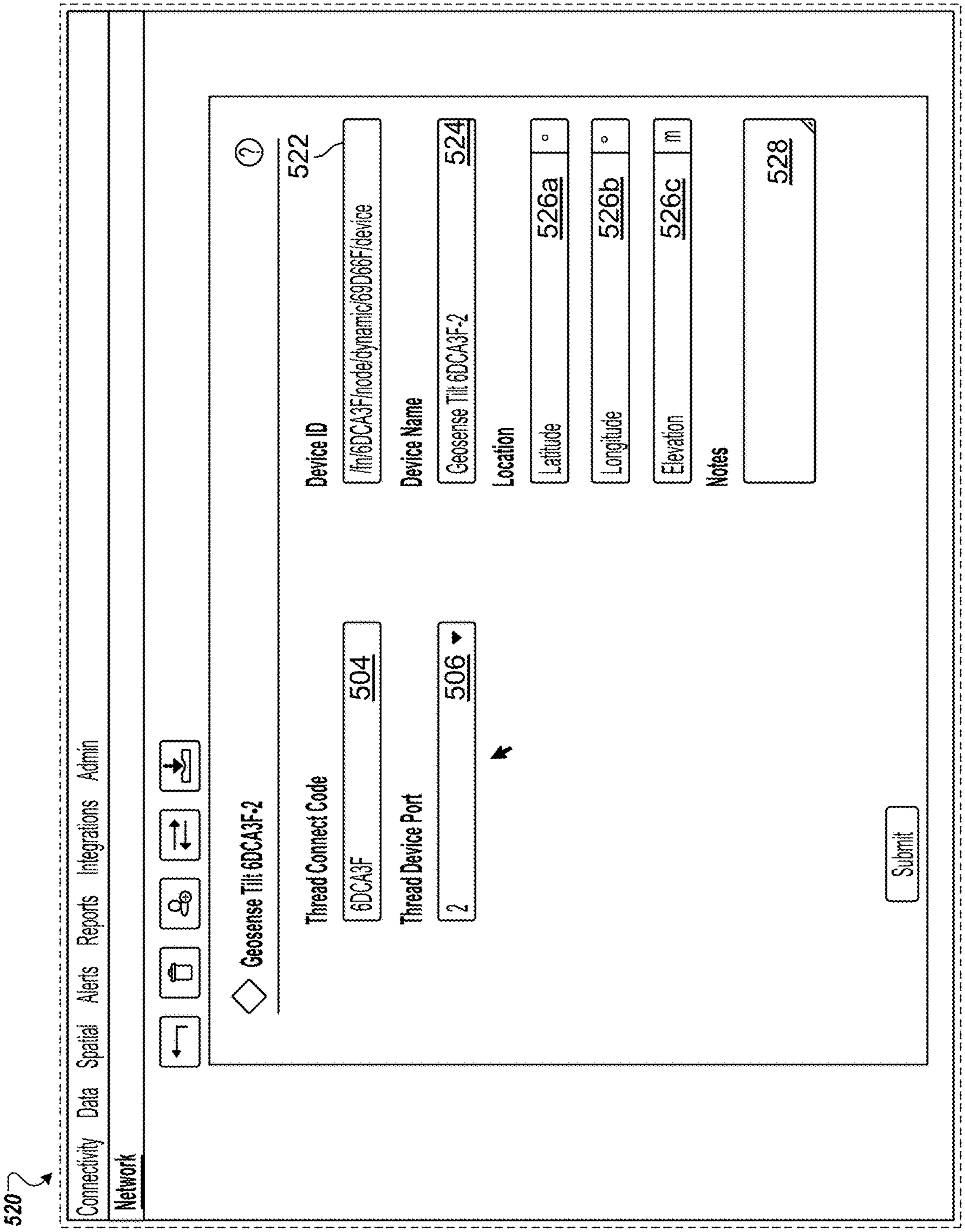

In some implementations, the user interactions with the display 814 cause a set of user entry data 828 to be provided back to the administrator GUI subsystem 812. The user entry data 828, for example, may identify selection of a particular device through the device look-up search control 502, entry of a connect code through the connect code entry control 504, and/or an selection of an aggregator port through the aggregator port selection control 506, as shown in the screen shot 500 of FIG. 5A. In another example, as shown in FIG. 5B, the user entry data 828 may include entry of a device name into the device name control 524, a location into the location controls 526, and/or notes entered into the notes text box 528, as shown in screen shot 520 of FIG. 5B.

The administrator GUI subsystem 812, in some implementations, provides the user entry data 828 to the device configuration subsystem 810 for addition to a device definition store 822 as at least a portion of a device definition 830. The device definition 830, for example, may be stored to a data store such as the data repository 110 of FIG. 1 (e.g., as one of the device definitions 152). Although not illustrated, to complete the device definition 830, the administrator GUI subsystem 812 may provide a series of presentation data 826 to the display 814 and, for each set of presentation data 826, receive back a set of user entry data 828. In illustration, a series of screen shots, such as the screen shot 500 of FIG. 5A followed by the screen shot 520 of FIG. 5B, may be iteratively presented at the display 814 to gather information for populating the device definition 830. The device definition 830 may be encoded in a single file or multiple files. In a particular illustration, the device definition 830, similar to the device integration definition shown in pane 344 of screen shot 340 of FIG. 3C, may be coded in YAML. In other embodiments, the device definition 830 may be coded in JSON, RAML, PHP, JavaScript, or Python.

Once the device definition 830 has been completed, in some implementations, the device definition 830 is provided to an aggregator configuration subsystem 816. The aggregator configuration subsystem 816 may be designed for communication with aggregator units such as the aggregators 106 of FIG. 1 which enable communication between the sensors/sensor devices 108 and the IIOT platform 102. The aggregator configuration subsystem 816, for example, may be similar to the aggregator management engine 146 of FIG. 1. The device definition 830 may include identification of the particular aggregator 806 for use by the aggregator configuration subsystem 816 in communicating the device definition 830. The aggregator configuration subsystem 816 may identify the aggregator 806 and provide the aggregator 806 with the device definition 830. For example, the aggregator configuration subsystem 816 may issue the device definition 830 over a network, such as the Internet, to the aggregator 806.

In some implementations, the aggregator 806 receives the device definition 830 from the aggregator configuration subsystem 816 (e.g., from the IIOT platform 802). The aggregator 806 is in communication with the device 804. For example, the aggregator 806 may be wired or wirelessly connected to the device 804 at the port designated in the device definition 830.

The aggregator 806, in some implementations, includes a sensor network configuration subsystem 820. The sensor network configuration subsystem 820 may store the device definition 830 for use in communicating with the device 804. For example, the sensor network configuration subsystem 820 may include one or more processors enabling parsing and application of the device definition 830 as well as communication with both the IIOT platform 802 and the device 804. Further, the sensor network configuration subsystem 820 may include a non-transitory computer readable medium such as a flash drive for storing the device definition 830. If the device definition 830 specifies a same device that has already been configured via the aggregator 806, the sensor network configuration subsystem 820 may replace a current device definition with the new device definition 830.

In some implementations, the sensor network configuration subsystem 820 extracts device configuration data 832 from the device definition 830 and uses the device configuration data 832 to configure the device 804. For example, the sensor network configuration subsystem 820 may issue configuration commands to the device 804 via the designated connection port. Further, a portion of the device definition 830, in some embodiments, may be used to configure the aggregator 806 in communicating with the device 804. For example, the device definition 830 may identify the baud rate (e.g., baud rate 414*b* as discussed in relation to FIG. 4B) the aggregator 806 should use in communicating with the device 804. In some embodiments, code hooks included in the device definition 830 may specify how to power on the device 804, request readings from the device 804, and/or synchronize the device 804 with the IIOT platform.

The sensor network configuration subsystem 820, in some implementations, receives generic commands from the IIOT platform related to the configured device and translates the generic commands into commands understood by the device. For example, the aggregator 806 may receive, from the aggregator configuration subsystem 816, a generic request to poll information from the device 804 and, in turn, request the information using the information polling code hook included in the device definition 830.

Although not illustrated, in other embodiments, the aggregator 806 may be connected to multiple devices. For example, the sensor network configuration subsystem 820 may be designed to store and apply multiple device definitions, one for each connected device. Further, the sensor network configuration subsystem 820, in other implementations, may receive one or more sensor definitions for communicating with one or more sensors connected to the aggregator 806.

Figure 9:
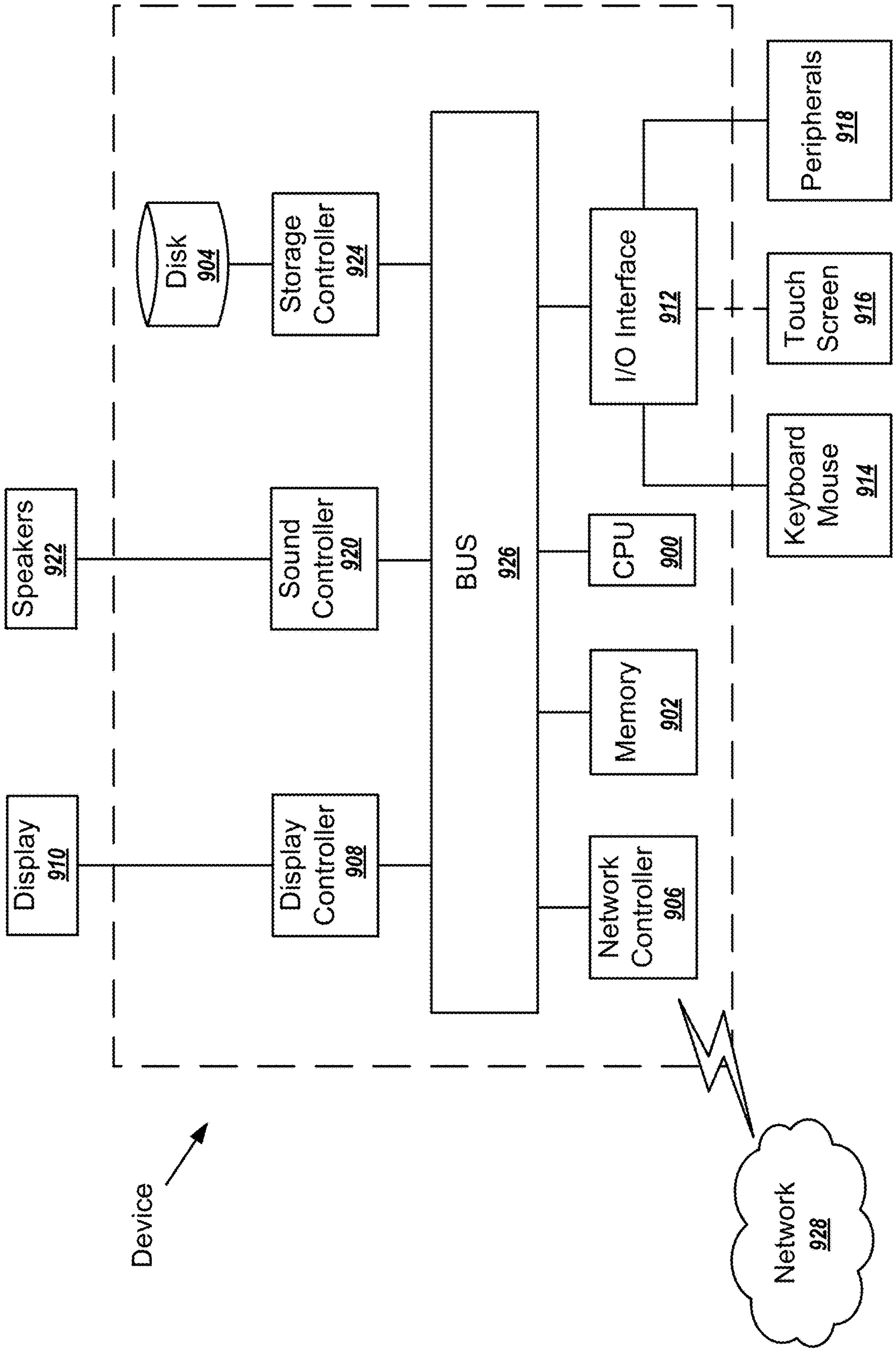
FIG. 9 is a block diagram of an example computing system.

Next, a hardware description of a computing device, mobile computing device, computing system, or server according to exemplary embodiments is described with reference to FIG. 9. The computing device, for example, may represent the clients 104 of FIG. 1, portions of the IIOT platform 102 of FIG. 1, the aggregators 106 of FIG. 1, portions of the IIOT platform 802 of FIG. 8, and/or the aggregator 806 of FIG. 8. In FIG. 9, the computing device, mobile computing device, or server includes a CPU 900 which performs the processes described above. The process data and instructions may be stored in memory 902. The processing circuitry and stored instructions may enable the computing device to perform, in some examples, the method

200 of FIG. 2A, the method 220 of FIG. 2B, the method 250 of FIG. 2C, and/or portions of the processing flow 800 of FIG. 8. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 904, in some examples, may store the contents of the data repository 110 of FIG. 1 and/or the device definitions data store 822 of FIG. 8.

Further, a portion of the claimed advancements may be provided as a utility application, background daemon, or component of an operating system, or combination thereof, executing in conjunction with CPU 900 and an operating system such as Microsoft Windows 7, 8, 10, UNIX, Solaris, LINUX, Apple MAC-OS and other systems known to those skilled in the art.

CPU 900 may be a Xeon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computing device, mobile computing device, or server in FIG. 9 also includes a network controller 906, such as an Intel Ethernet PRO network interface card from Intel Corporation of America, for interfacing with network 928. As can be appreciated, the network 928 can be a public network, such as the Internet, or a private network such as an LAN or WAN network, or any combination thereof and can also include PSTN or ISDN sub-networks. The network 928 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 928, for example, may support communications between the IIOT platform 102 and the clients 104 of FIG. 1, the IIOT platform 102 and the aggregators 106 of FIG. 1, the aggregators 106 and the sensors/sensor devices 108 of FIG. 1, the IIOT platform 802 and the display 814 of FIG. 8, the IIOT platform 802 and the aggregator 806 of FIG. 8, and/or the aggregator 806 and the device 804 of FIG. 8.

The computing device, mobile computing device, or server further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard. The display controller 908 and display 910 may enable presentation of user interfaces presented in the screen shot 300 of FIG. 3A, the screen shot 320 of FIG. 3B, the screen shot 340 of FIG. 3C, the screen shot 400 of FIG. 4A, the screen shot 410 of FIG. 4B, the screen shot 420 of FIGS. 4C and 4D, the screen shot 430 of FIG. 4E, the screen shot 440 of FIG. 4F, the screen shot 450 of FIG. 4G, the screen shot 500 of FIG. 5A, the screen shot 520 of FIG. 5B, the screen shot 600 of FIG. 6, the screen shot 700 of FIG. 7A, and/or the screen shot 710 of FIG. 7B.

A sound controller 920 is also provided in the computing device, mobile computing device, or server, such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device, mobile computing device, or server. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 10:
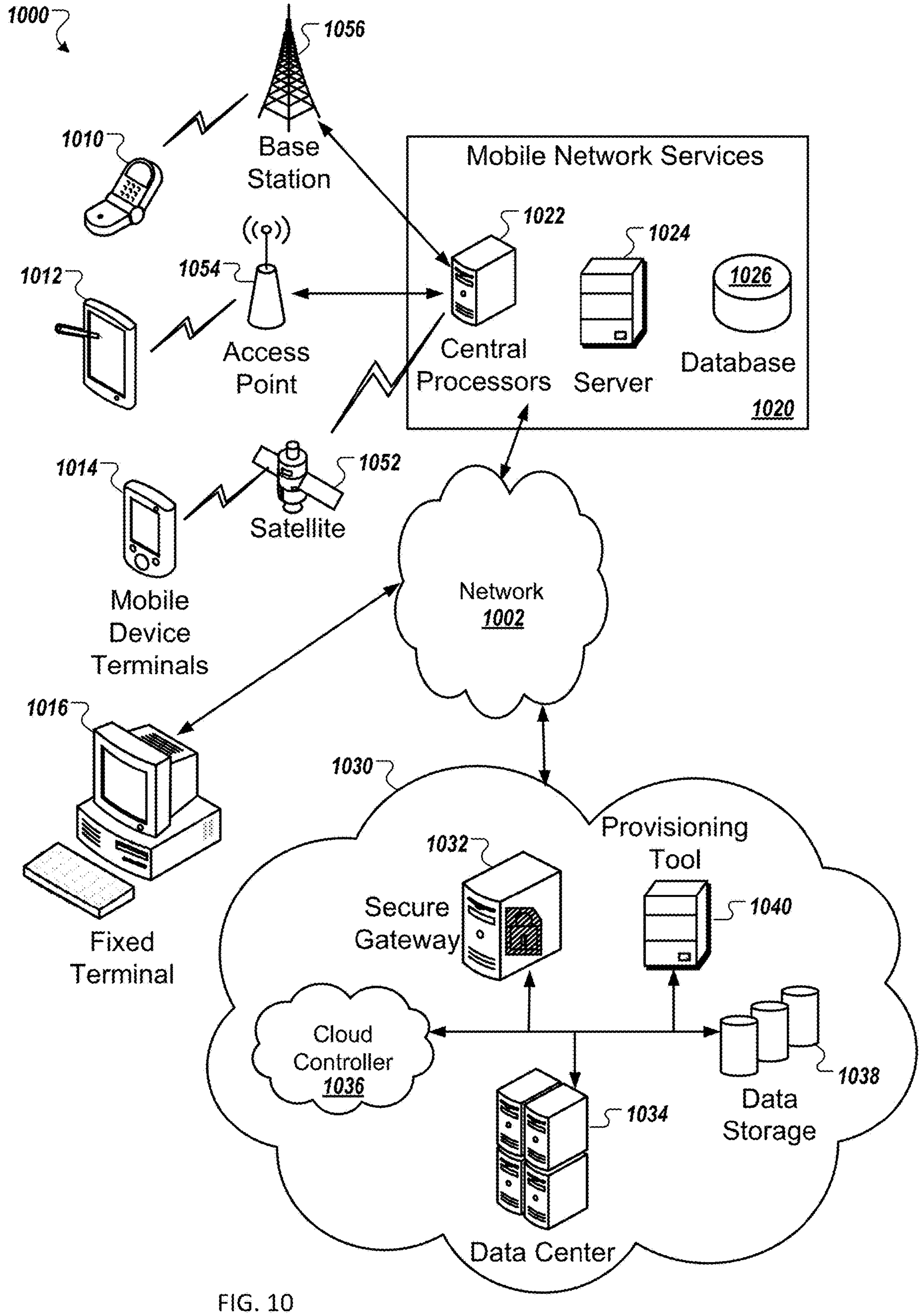
FIG. 10 is a block diagram of an example distributed computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the computing devices described herein may interface with a cloud computing environment 1030, such as Google Cloud Platform™ to perform at least portions of methods or algorithms detailed above. The processes associated with the methods described herein can be executed on a computation processor, such as the Google Compute Engine by data center 1034. The data center 1034, for example, can also include an application processor, such as the Google App Engine, that can be used as the interface with the systems described herein to receive data and output corresponding information. The cloud computing environment 1030 may also include one or more databases 1038 or other data storage, such as cloud storage and a query database. In some implementations, the cloud storage database 1038, such as the Google Cloud Storage, may store processed and unprocessed data supplied by systems described herein. For example, the device identifiers 150, device definitions 152, device integration definitions 154, sensor definitions 156, sensor integration definitions 158, sensor data 160, aggregator identifiers 162, code hook templates 164, control templates 166, derived metrics 168, and/or category definitions 170 of FIG. 1 may be stored in a database form in some embodiments. Further, the device integration definitions 834, device definitions 822, and/or user interface settings 808 of FIG. 8 may be stored in a database form in some embodiments.

The systems described herein may communicate with the cloud computing environment 1030 through a secure gateway 1032. In some implementations, the secure gateway 1032 includes a database querying interface, such as the Google BigQuery platform. The data querying interface, for example, may support access by device integration engine 124, the device configuration engine 126, the sensor integration engine 128, the sensor configuration engine 130, the integration management engine 132, the configuration archival engine 134, the category definition engine 136, the graphical user interface engine 138, the metrics calculation engine 140, the metrics presentation engine 142, the data archival engine 144, and/or the aggregator management engine 146 of the IIOT platform of FIG. 102, in some embodiments. In some embodiments, the data query interface may support access by the device configuration subsystem 810 and/or the administrator GUI subsystem 812 of FIG. 8.

The cloud computing environment 1030 may include a provisioning tool 1040 for resource management. The provisioning tool 1040 may be connected to the computing devices of a data center 1034 to facilitate the provision of computing resources of the data center 1034. The provisioning tool 1040 may receive a request for a computing resource via the secure gateway 1032 or a cloud controller 1036. The provisioning tool 1040 may facilitate a connection to a particular computing device of the data center 1034.

A network 1002 represents one or more networks, such as the Internet, connecting the cloud environment 1030 to a number of client devices such as, in some examples, a cellular telephone 1010, a tablet computer 1012, a mobile computing device 1014, and a desktop computing device 1016. The network 1002 can also communicate via wireless networks using a variety of mobile network services 1020 such as Wi-Fi, Bluetooth, cellular networks including EDGE, 3G, 4G, and 5G wireless cellular systems, or any other wireless form of communication that is known. In some examples, the wireless network services 1020 may include central processors 1022, servers 1024, and databases 1026. In some embodiments, the network 1002 is agnostic to local interfaces and networks associated with the client devices to allow for integration of the local interfaces and networks configured to perform the processes described herein. Additionally, external devices such as the cellular telephone 1010, tablet computer 1012, and mobile computing device 1014 may communicate with the mobile network services 1020 via a base station 1056, access point 1054, and/or satellite 1052.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for generating a new device integration definition to be used for configuring a device type for interoperability with an industrial internet of things platform, the method comprising:

providing, by processing circuitry for presentation to a user at a remote computing device, first presentation data for presenting a first user interface for creating the new device integration definition, wherein the first presentation data comprises a plurality of controls, each control configured to accept user input for a different device parameter of a plurality of device parameters;

receiving, by the processing circuitry from the remote computing device, respective first user input from each of at least a portion of the plurality of controls, wherein the first user input comprises at least one input corresponding to a communication parameter for communicating with the device type of the new device integration definition;

adding, by the processing circuitry, the communication parameter to the new device integration definition, wherein the new device integration definition is stored in a programming language syntax, and the new device integration definition is arranged in a standardized format including a plurality of configurable parameters, wherein the plurality of configurable parameters comprises the plurality of device parameters;

providing, by the processing circuitry for presentation to the user at the remote computing device, second presentation data for presenting a second user interface for creating the new device integration definition, wherein the second presentation data comprises a plurality of code hook templates, each code hook template supplying a program language syntax stub for a different code hook for communicating with the device type, and a user interface region for editing the program language syntax stub of a selected code hook template;

receiving, by the processing circuitry from the remote computing device, second user input comprising code hook syntax corresponding to at least one code hook template, the code hook syntax for each code hook template representing an edited version of a respective code hook template;

saving, by the processing circuitry, the code hook syntax to the new device integration definition;

receiving, by the processing circuitry from the remote computing device, third user input comprising identification of a communication link between an aggregator device configured to communicate with the IIOT platform and a test device of the device type;

downloading, by the processing circuitry to the aggregator device via the communication link, a device configuration file, wherein the device configuration file is based on the new device integration definition, and the device configuration file comprises the code hook syntax; and enabling, by the processing circuitry for the user at the remote computing device, testing of the code hook syntax on the test device via the second user interface, wherein enabling testing comprises enabling communication between the aggregator device and the test device using the communication parameter.

2. The method of claim 1, wherein the programming language syntax is YAML.

3. The method of claim 1, wherein the code hook templates comprise a polling template for obtaining a reading from at least one sensor of the device type.

4. The method of claim 3, wherein the plurality of device parameters comprise a subset of sensor parameters related to the at least one sensor of the device type.

5. The method of claim 1, wherein the user interface region for editing the program language syntax stub comprises a text input pane, wherein at least a portion of the new device integration definition including the program language syntax stub of the selected code hook template is provided in the text input pane.

6. The method of claim 1, wherein enabling testing of the code hook syntax corresponding to the at least one code hook template comprises providing, by the processing circuitry to the remote computing device, third presentation data for presenting a presentation pane configured to present, in real-time, feedback received from the aggregator device.

7. The method of claim 1, further comprising storing, by the processing circuitry to a non-transitory computer readable medium, the new device integration definition for use by a plurality of clients of the IIOT platform in configuring devices of the device type.

8. The method of claim 1, further comprising:

preparing, by the processing circuitry for presentation to the user at the remote computing device, third presentation data for presenting a third user interface for creating the new device integration definition, wherein the third presentation data comprises a plurality of control templates, each control template identifying a control type for accepting user input for a different device configuration parameter of a plurality of device configuration parameters;

providing, by the processing circuitry to the remote computing device, the third presentation data;

receiving, by the processing circuitry from the remote computing device, fourth user input identifying selection of at least one control template of the plurality of control templates; and saving, by the processing circuitry, the at least one control template to the new device integration definition.

9. The method of claim 8, wherein the plurality of control templates comprises at least one of a text input control, a location input control, or a frequency selection control.

10. The method of claim 1, wherein receiving the respective first user input comprises:

receiving input related to a second device parameter of the plurality of device parameters, wherein the second device parameter defines a second communication parameter for communicating with the device type of the new device integration definition; and adding, by the processing circuitry, the second device parameter to the new device integration definition.

11. The method of claim 10, wherein the first device parameter is an interface type and the second device parameter is one of i) a communication rate or speed or ii) a resistance, current, or voltage.

12. The method of claim 1, wherein the at least one code hook template comprises a first code hook template configured to confirm that the test device is in communication with the aggregator device.

13. A system for configuring various device types for interoperability with an industrial internet of things platform, the system comprising:

an aggregator unit comprising a first communication link for communicating with an industrial internet of things (IIOT) control platform, a second communication link for communicating with at least one IIOT sensor device, and a non-transitory computer-readable memory; and the IIOT control platform comprising a non-transitory computer-readable data store, and hardware logic and/or processing circuitry for executing software logic, wherein the hardware logic and/or software logic is configured to enable a third party to populate a device integration definition template for integrating a new device type with the IIOT control platform, the device integration definition template including a plurality of configurable parameters arranged in a standardized format, wherein the plurality of configurable parameters comprises a plurality of device parameters, and a plurality of code hook templates, each code hook template supplying a program language syntax stub for a different code hook for communicating with the new device type, obtain, from the third party via a network, a new device integration definition generated from the device integration definition template, wherein the new device integration definition comprises a plurality of sensor parameters, and code hook syntax for at least one code hook template of the plurality of code hook templates, wherein the code hook syntax for each code hook template of the at least one code hook template is designed for communicating information with a sensor device of the new device type, generate a device configuration file using the new device integration definition, download, to the aggregator unit via the first communication link of the first aggregator unit, the device configuration file, wherein the aggregator unit is connected to a test device of the new device type via the second communication link of the aggregator unit;

test the code hook syntax corresponding to each code hook template of the at least one code hook template on the test device using the aggregator unit, based on successful testing of the code hook syntax, save the new device integration definition to the non-transitory computer readable data store, and establish access to the new device integration definition by a plurality of users of the IIOT control platform using at least one of a device model number, a device identifier, or a device name.

14. The system of claim 13, wherein testing the code hook syntax corresponding to each code hook template of the at least one code hook template comprises executing the code hook syntax corresponding to each code hook template of the at least one code hook template on the aggregator unit via a user interface presented to a client by the IIOT control platform.

15. The system of claim 13, wherein enabling the third party to populate the device integration definition template comprises providing, for presentation to a user at a remote computing device, an interactive graphical user interface for creating the new device integration definition.

16. The system of claim 13, wherein establishing access to the new device integration definition comprises providing access, via an interactive graphical user interface, to create a new device instance in the IIOT control platform of the new device type.

17. The system of claim 16, wherein the interactive graphical user interface provides one or more controls, defined within the new device integration definition, for customizing one or more parameters of the plurality of device parameters of the new device integration definition.

18. The system of claim 13, wherein enabling the third party to populate the device integration definition template comprises providing, for presentation to a user at a remote computing device, an interactive graphical user interface for creating a new sensor integration for each sensor of at least one sensor of the new device type, wherein the new device integration definition comprises the new sensor integration, and the new sensor integration comprises at least a portion of the plurality of sensor parameters.

19. The system of claim 13, wherein testing the code hook syntax corresponding to each code hook template of the at least one code hook template comprise confirming, via a graph or plot layout, readings received from the test device and/or derived metrics obtained from the test device over a period of time.

* * * * *